US011922084B2

(12) United States Patent
Kaneda et al.

(10) Patent No.: US 11,922,084 B2
(45) Date of Patent: Mar. 5, 2024

(54) IMAGE PRINTING APPARATUS HAVING PRINT SETTING VALUES, PRINTING SYSTEM, CONTROL METHOD, AND STORAGE MEDIUM

(71) Applicant: CANON KABUSHIKI KAISHA, Tokyo (JP)

(72) Inventors: Takeshi Kaneda, Funabashi (JP); Yoshiji Kanamoto, Tokyo (JP); Toshihiko Iida, Toride (JP); Yasunori Kanai, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/908,917

(22) Filed: Jun. 23, 2020

(65) Prior Publication Data
US 2020/0319830 A1  Oct. 8, 2020

Related U.S. Application Data

(63) Continuation of application No. PCT/JP2018/046819, filed on Dec. 19, 2018.

(30) Foreign Application Priority Data

Dec. 28, 2017  (JP) .................................. 2017-254234

(51) Int. Cl.
*G06F 3/12* (2006.01)
(52) U.S. Cl.
CPC .......... *G06F 3/1288* (2013.01); *G06F 3/1222* (2013.01); *G06F 3/123* (2013.01);
(Continued)

(58) Field of Classification Search
CPC ...... G06F 3/1222; G06F 3/123; G06F 3/1231; G06F 3/1238; G06F 3/1285; G06F 3/1288; G06F 3/1292
See application file for complete search history.

(56) References Cited

U.S. PATENT DOCUMENTS 7,209,250 B2    4/2007  Nakao
7,686,525 B2    3/2010  Uchida
(Continued)

FOREIGN PATENT DOCUMENTS

CN    101533339 A    9/2009
CN    102236537 A    11/2011
(Continued)

OTHER PUBLICATIONS

Kennedy, Smith (Wireless & Standards Architec), [IPP] New stable draft of IPP Get-User-Printer-Attributes (GUPA) posted for review and last call, Nov. 16, 2017 (Year: 2017).*

(Continued)

*Primary Examiner* — Barbara D Reinier
(74) *Attorney, Agent, or Firm* — VENABLE LLP

(57) ABSTRACT

An image forming apparatus includes a controller configured to receive, from an information processing apparatus, a set of print setting values, an identifier of the set, and a user identifier, register the received set of print setting values in association with the received identifier of the set and the received user identifier, and receive, from an information processing apparatus, a first request for obtaining the registered identifier of the set. The received first request includes the user identifier of a user that operates the information processing apparatus that has transmitted the first request. The controller also transmits, to the information processing apparatus that has transmitted the first request, the identifier of the set registered in association with the user identifier included in the first request, wherein the information processing apparatus that has received the identifier of the set displays a print setting screen using the received identifier of the set.

13 Claims, 30 Drawing Sheets

(52) U.S. Cl.
CPC .......... *G06F 3/1238* (2013.01); *G06F 3/1285* (2013.01); *G06F 3/1292* (2013.01)

(56) References Cited

U.S. PATENT DOCUMENTS

| | | | |
|---|---|---|---|
| 8,345,277 B2 | 1/2013 | Emori | |
| 8,711,382 B2 | 4/2014 | Yamamoto | |
| 8,810,837 B2 | 8/2014 | Ikeda | |
| 8,902,453 B2 | 12/2014 | Hong | |
| 9,671,990 B2 | 6/2017 | Takenaka | |
| 9,753,683 B2 | 9/2017 | Oonami | |
| 10,168,967 B2 | 1/2019 | Takenaka | |
| 10,200,552 B2 | 2/2019 | Maeda | |
| 10,205,846 B1* | 2/2019 | Bermundo | H04N 1/00514 |
| 10,452,323 B2* | 10/2019 | Iwamoto | G06F 3/1258 |
| 10,504,014 B2* | 12/2019 | Kaneda | G06K 15/4065 |
| 11,099,793 B2* | 8/2021 | Kaneda | B41J 29/38 |
| 11,520,534 B2* | 12/2022 | Kaneda | G06F 3/1258 |
| 2002/0035941 A1* | 3/2002 | Nakao | G06F 3/1204 101/484 |
| 2002/0077980 A1 | 6/2002 | Chang et al. | |
| 2006/0005044 A1* | 1/2006 | Uchikawa | H04L 63/104 713/168 |
| 2006/0238794 A1* | 10/2006 | Hada | G06F 3/1285 358/1.13 |
| 2007/0097448 A1* | 5/2007 | Iizuka | G06F 21/608 358/1.16 |
| 2007/0146732 A1 | 6/2007 | Piazza et al. | |
| 2009/0003913 A1 | 1/2009 | Uchida | |
| 2009/0213415 A1* | 8/2009 | Shozaki | G06F 3/1238 358/1.15 |
| 2011/0058208 A1* | 3/2011 | Takahashi | G06F 3/1287 358/1.14 |
| 2012/0137236 A1* | 5/2012 | Abe | G06F 3/04847 715/763 |
| 2015/0261481 A1* | 9/2015 | Takenaka | H04N 1/0035 358/1.15 |
| 2015/0277827 A1 | 10/2015 | Oonami | |
| 2015/0358505 A1* | 12/2015 | Diaz | G06F 21/608 358/1.14 |
| 2017/0230536 A1* | 8/2017 | Haapanen | G06F 3/1292 |

FOREIGN PATENT DOCUMENTS

| | | |
|---|---|---|
| CN | 104917919 A | 9/2015 |
| CN | 105849689 A | 8/2016 |
| CN | 106383675 A | 2/2017 |
| EP | 1071007 A2 | 1/2001 |
| JP | 2001-154817 A | 6/2001 |
| JP | 2002-073304 A | 3/2002 |
| JP | 2007-272602 A | 10/2007 |
| JP | 2009-217516 A | 9/2009 |
| JP | 2012-147335 A | 8/2012 |
| JP | 2013-089153 A | 5/2013 |
| JP | 2013-187571 A | 9/2013 |
| JP | 2015-174299 A | 10/2015 |
| JP | 2015-191645 A | 11/2015 |
| JP | 2017-060064 A | 3/2017 |
| WO | 2015/047033 A1 | 4/2015 |

OTHER PUBLICATIONS

The Printer Working Group, IPP Get-User-Printer-Attributes, Nov. 16, 2017 (Year: 2017).*
PCT International Search Report and Written Opinion dated Mar. 12, 2019, in International Application No. PCT/JP2018/046819.
Chinese Office Action dated Jun. 18, 2021, in related Chinese Patent Application No. 201880084510.8 (with English translation).
European Search Report dated Aug. 20, 2021, in related European Patent Application No. 18895170.1.

* cited by examiner

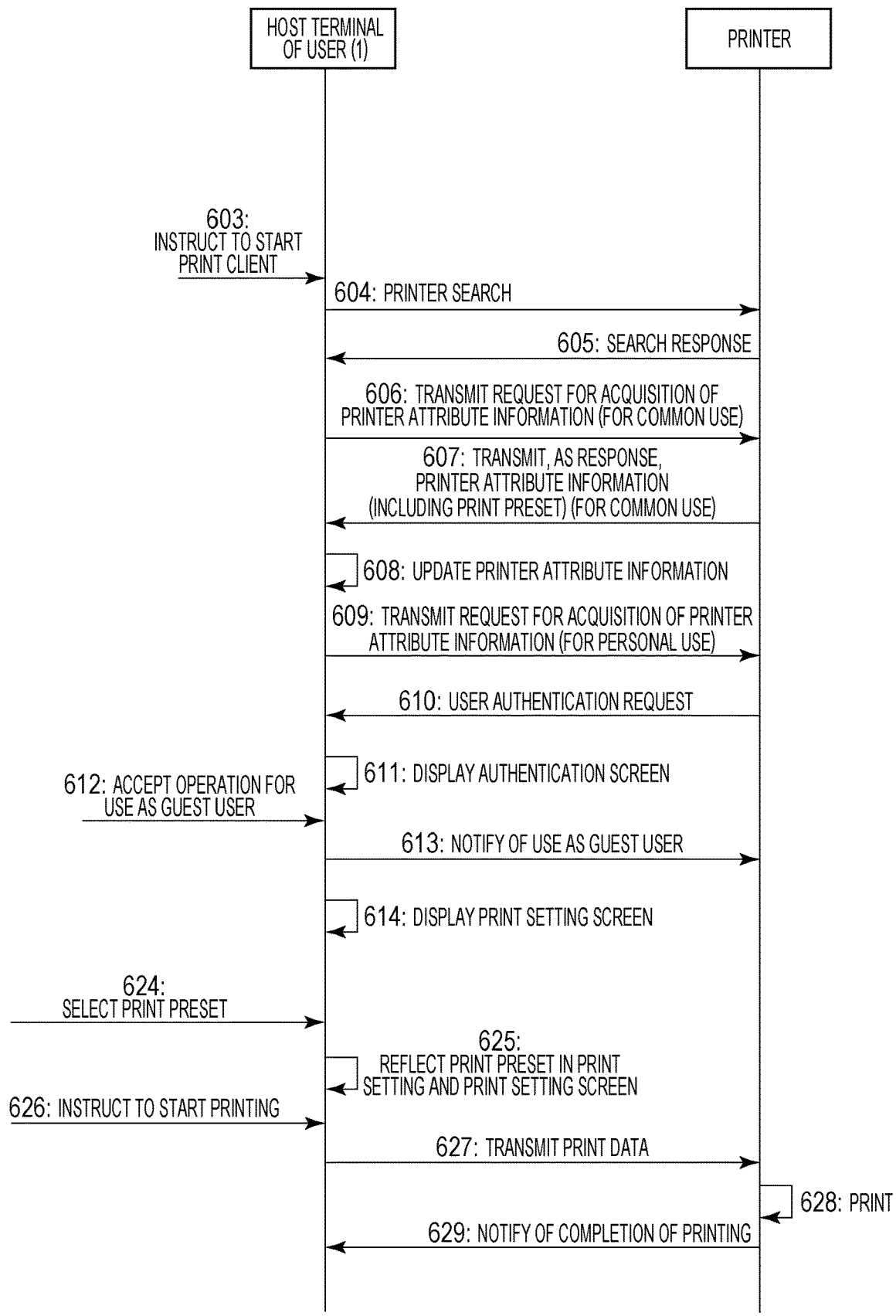

FIG. 7A

| PRESET NAME | CATEGORY | OWNER IDENTIFIER | SETTING ITEM | | | | |
|---|---|---|---|---|---|---|---|
| | | | COLOR PRINTING | PRINT SIDE | | STAPLING | PUNCHING |
| Common Preset 001 | STANDARD | Guest | COLOR | TWO-SIDED | | NO | NO |
| My preset -1 | USER | Suzuki | COLOR | TWO-SIDED | ... | ONE STAPLE AT UPPER LEFT | NO |
| My preset -2 | USER | Suzuki | COLOR | TWO-SIDED | | NO | LEFT |
| My preset -3 | USER | Suzuki | MONOCHROME | TWO-SIDED | | TWO STAPLES ON LEFT | NO |
| Preset for XXX | USER | Tanaka | COLOR | ONE-SIDED | | NO | TOP |
| Preset for YYY | USER | Tanaka | MONOCHROME | TWO-SIDED | | ONE STAPLE AT UPPER RIGHT | NO |
| Common Preset 002 | STANDARD | Guest | COLOR | ONE-SIDED | | ONE STAPLE AT UPPER LEFT | LEFT |

FIG. 7B

| PRESET NAME | CATEGORY | GROUP IDENTIFIER | SETTING ITEM | | | | |
|---|---|---|---|---|---|---|---|
| | | | COLOR PRINTING | PRINT SIDE | | STAPLING | PUNCHING |
| Common Preset 001 | STANDARD | Guest | COLOR | TWO-SIDED | | NO | NO |
| My preset -1 | USER | Accounting | COLOR | TWO-SIDED | ... | ONE STAPLE AT UPPER LEFT | NO |
| My preset -2 | USER | Accounting | COLOR | TWO-SIDED | | NO | LEFT |
| My preset -3 | USER | Accounting | MONOCHROME | TWO-SIDED | | TWO STAPLES ON LEFT | NO |
| Preset for XXX | USER | Sales | COLOR | ONE-SIDED | | NO | TOP |
| Preset for YYY | USER | Sales | MONOCHROME | TWO-SIDED | | ONE STAPLE AT UPPER RIGHT | NO |
| Common Preset 002 | STANDARD | Guest | COLOR | ONE-SIDED | | ONE STAPLE AT UPPER LEFT | LEFT |

FIG. 7C

| USER ID | PASSWORD | GROUP USER BELONGS TO | AUTHORITY |
|---|---|---|---|
| Suzuki | ******* | Accounting | general |
| Tanaka | ******* | Sales | general |
| Sato | ******* | Sales | general |
| Yamada | ******* | – | administrator |

FIG. 8A

```
"Get-Printer-Attributes";
  RequestAttributes=   (
              {
                 "attributes-charset" = "utf-8";
                 "attributes-natural-language" = en;
                 "printer-uri" = "ipp://xxxx.local.:631/ipp/print";
  }
       );
       RequestId= 123456;
```
— 801

```
ResponseAttributes=   (
           {
              "attributes-charset" = "utf-8";
              "attributes-natural-language" = "ja-jp";
           },
           {
              "charset-configured" = "utf-8";
              "charset-supported" = "utf-8";
              "color-mode-default" = default;
              "color-mode-supported" = (
                 default,
                 mono,
                 color
              );
              "color-supported" = 1;
              "operations-supported" = (
                         Get-User-Printer-Attributes,
                 <OMITTED>
              );
<OMITTED>

"print-preset-list" = [
           "print-preset" = (
                 "name" = "Common Preset 001",
                 "owner" = "Administrator",
                    "color-mode"  = "color",
                    "plex" = "duplex",

<OMITTED>

"staple" = "none",
                    "punch" = "none"
                    ),
           "print-preset" = (
                 "name" = "Common Preset 002",
                 "owner" = "Administrator"
                    "color-mode"  = "color",
                    "plex" = "simplex",

<OMITTED>

"staple" = "corner-upperleft",
                    "punch" = "left"
                    )

<OMITTED>
           ]
}})
```
— 802

```
"Get-User-Printer-Attributes";
  RequestAttributes=  (
           {
               "attributes-charset" = "utf-8";                              ─ 805
               "attributes-natural-language" = en;
               "printer-uri" = "ipp://xxxx.local.:631/ipp/print";
        }
     );
     RequestId= 123457;

ResponseAttributes=   (
           {
               "attributes-charset" = "utf-8";                              ─ 806
               "attributes-natural-language" = "ja-jp";
           },
<OMITTED>
  "print-preset-list" = [
               "print-preset" = (
                   "name" = "My preset -1",
                   "owner" = "Suzuki",
                      "color-mode"  = "color",
                      "plex" = "duplex",

<OMITTED>

"staple" = "courner-upperleft",
                      "punch" = "none"
                 ),
               "print-preset" = (
                  "name" = "My preset -2",
                  "owner" = "Suzuki"
                      "color-mode"  = "color",                              ─ 808
                      "plex" = "duplex",

<OMITTED>

"staple" = "none",
                      "punch" = "left"
                 ),
               "print-preset" = (
                  "name" = "My preset -3",
                  "owner" = "Suzuki"
                      "color-mode"  = "monochrome",
                      "plex" = "duplex",

<OMITTED>

"staple" = "double-left",
                      "punch" = "none"
                  )
              ]
 })
```

FIG. 9

EXAMPLE OF PRINT DATA

```
"Create-Job";

OperationAttributes = (
    {
    "attributes-charset" = "utf-8";
    "attributes-natural-language" = en;
    "printer-uri" = "ipp://xxxx.local.:631/ipp/print";
    "requesting-user-name" = "Suzuki"
    }
);

JobAttributes = (                                   ~901
    "output-bin" = "auto",
    "colot-mode" = "color",
    "plex" = "duplex",
    <OMITTED>
    "staple" = "courner-upperleft"
    "punch" = "none"
);
```

FIG. 10C http://192.168.0.2/PresetManager.html | Remote UI Preset Manager

Remote UI Preset Manager

Common Preset List — 1004

[Add New Common Preset]  [Logout]

| # | Preset Name | | 1005 | 1006 |
|---|---|---|---|---|
| 001 | Common Preset 001 | | [Edit] | [Delete] |
| 002 | Common Preset 002 | | [Edit] | [Delete] |
| 003 | UNREGISTERED | | [Edit] | [Delete] |
| 004 | UNREGISTERED | | [Edit] | [Delete] |
| 005 | UNREGISTERED | | [Edit] | [Delete] |
| 006 | UNREGISTERED | | [Edit] | [Delete] |
| 007 | UNREGISTERED | | [Edit] | [Delete] |

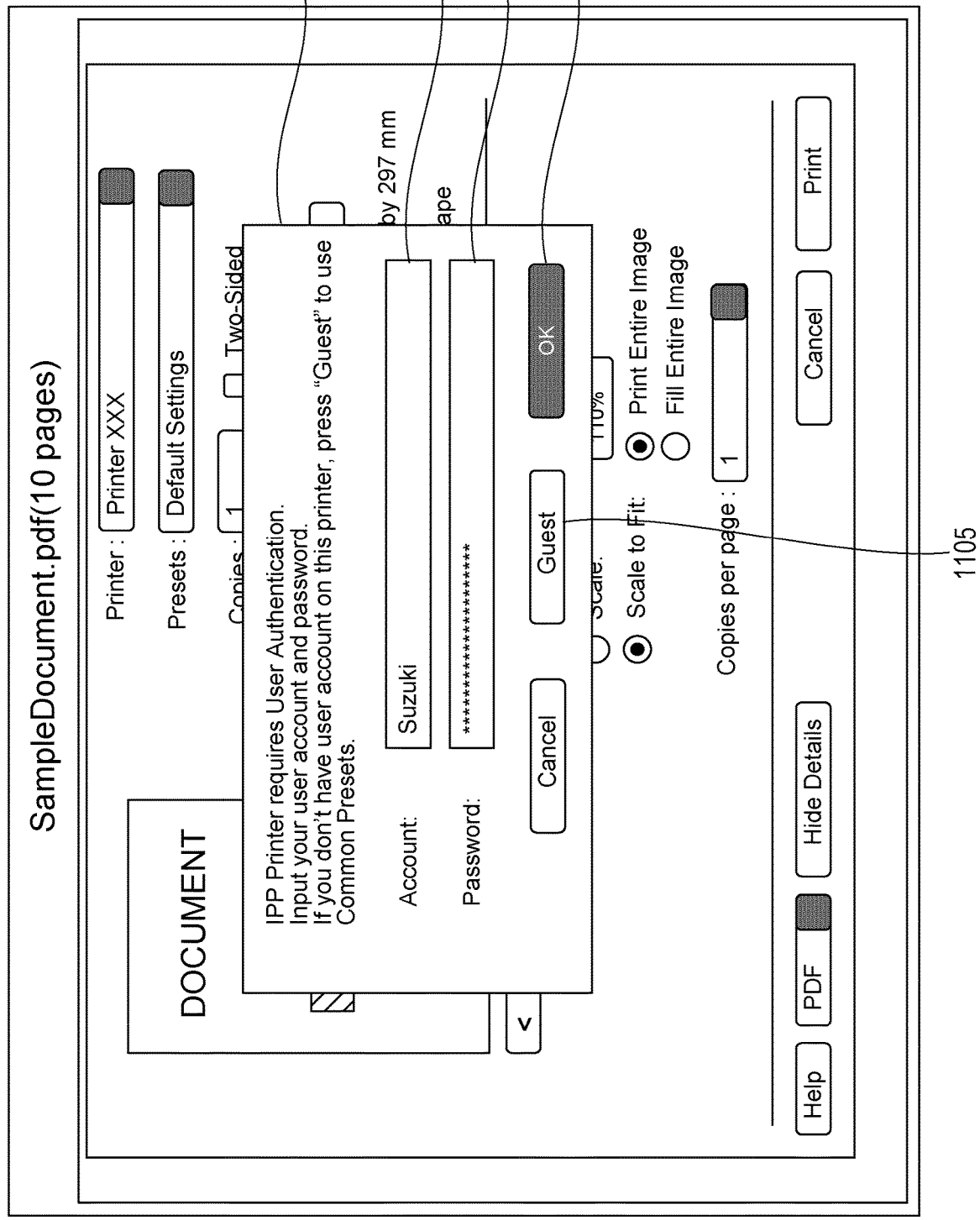

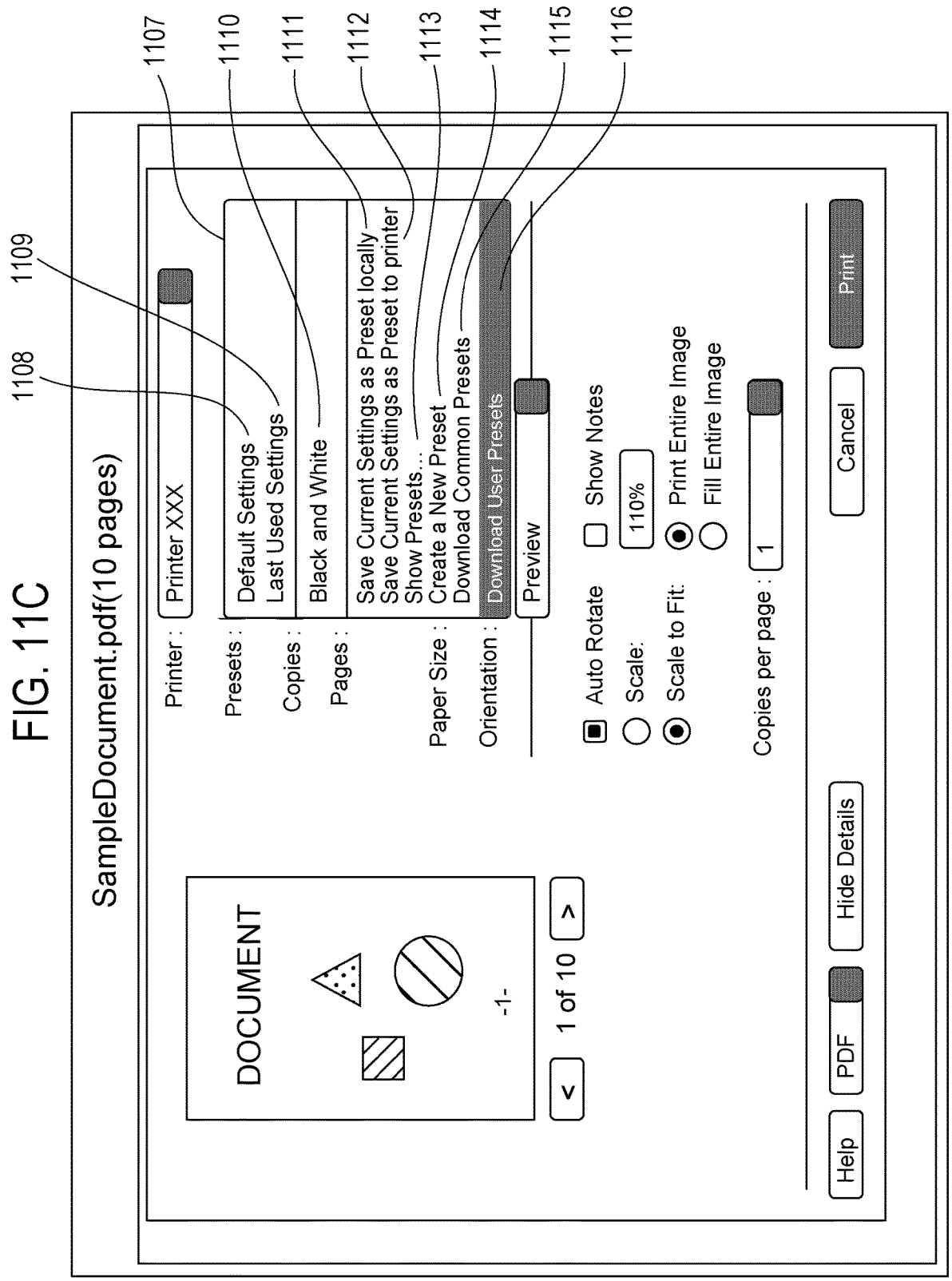

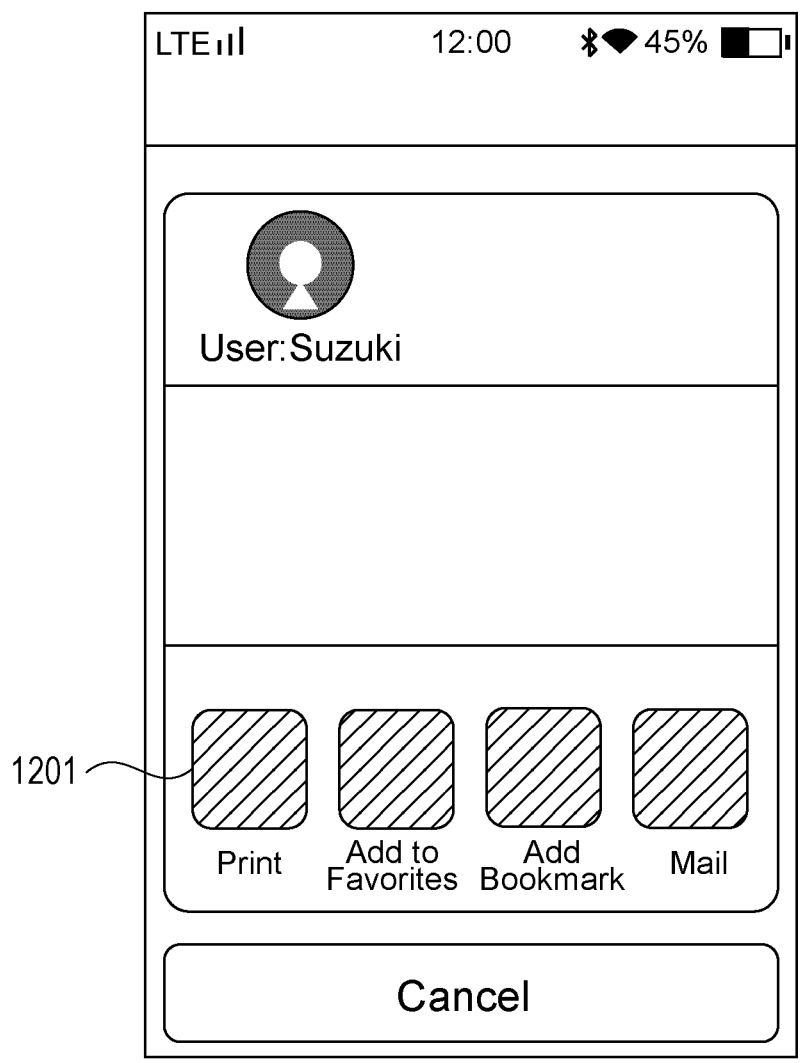

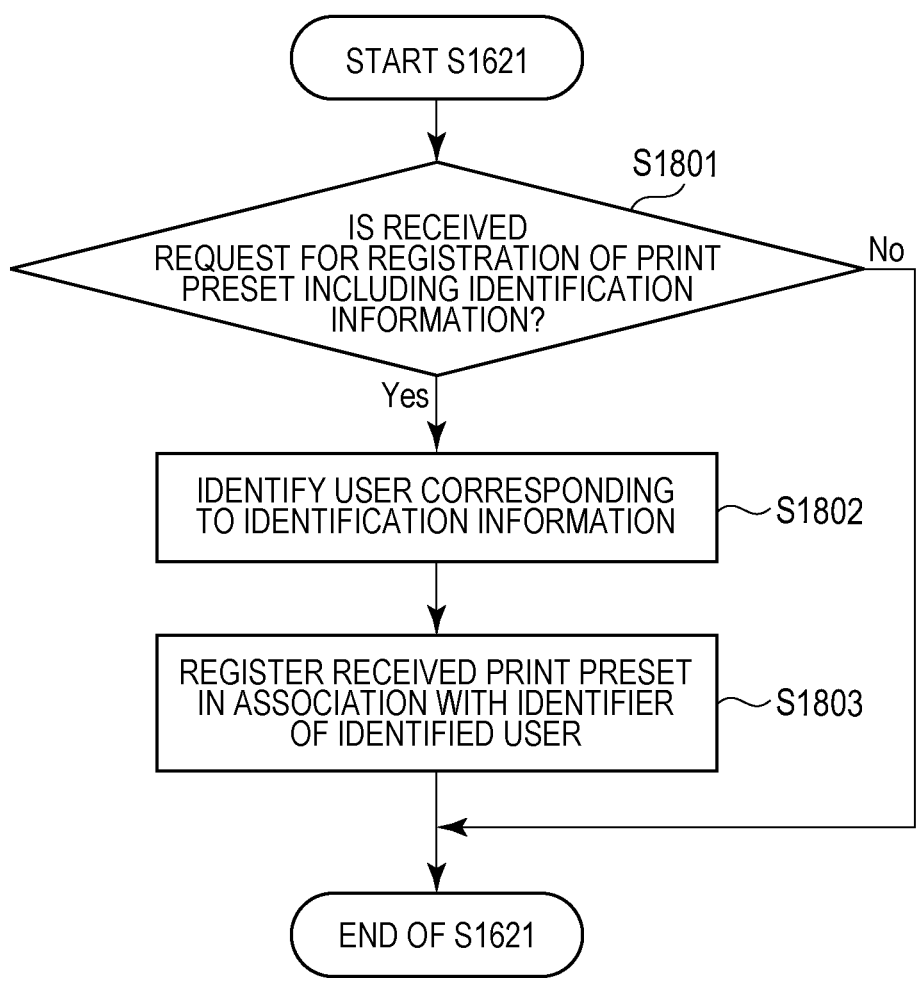

IMAGE PRINTING APPARATUS HAVING PRINT SETTING VALUES, PRINTING SYSTEM, CONTROL METHOD, AND STORAGE MEDIUM

CROSS-REFERENCE TO RELATED APPLICATIONS

This application is a Continuation of International Patent Application No. PCT/JP2018/046819, filed Dec. 19, 2018, which claims the benefit of Japanese Patent Application No. 2017-254234, filed Dec. 28, 2017, both of which are hereby incorporated by reference herein in their entirety.

BACKGROUND OF THE INVENTION

Field of the Invention

The present invention relates to an image forming apparatus configured to receive data and form an image, a printing system, a control method, and a storage medium.

Description of the Related Art

In a conventional known image forming apparatus, print data is received from a communication apparatus via a network and an image is formed on a sheet based on the received print data. It is also known to generate print data to be transmitted to an image forming apparatus using a printer driver (or a print application) designed to use each image forming apparatus.

Furthermore, in recent years, it is known to generate print data without using a printer driver (or a print application) designed to use each image forming apparatus. For example, means is known for generating print data by a general-purpose print client provided as a function of an operating system (OS) of a communication apparatus or a general-purpose print client provided by a print server on a cloud and transmitting the print data to the image forming apparatus. In such a general-purpose print client, a mechanism is implemented for performing printing based on a network protocol (IPP: Internet Printing Protocol) for causing an image forming apparatus to execute printing. A printing process is realized by performing communication between the image forming apparatus and a communication apparatus according to this protocol.

For example, Japanese Patent Application Laid-Open No. 2013-187571 discloses that when an image is selected on a screen of a communication apparatus and printing thereof is instructed, searching for nearby image forming apparatuses is performed and retrieved image forming apparatuses are displayed in a list. Furthermore, it is also described that a protocol suitable for transmitting image data is selected based on protocol information supported by a selected image forming apparatus, and the image data for printing is transmitted using the selected protocol.

In the PWG (Printer Working Group), IPP specifications are under development, and a print preset function is under discussion for providing an enhanced convenience to users in a print client based on the IPP. In print presets (IPP Presets) whose specifications are under development by PWG, a name is given to a set of combinations of print setting items and print setting values. Use of a print preset makes it possible to collectively reflect, in print settings, various setting items such as two-sided printing, color setting, stapling setting, and/or the like, and thus a high convenience can be provided to a user.

Such print presets may be stored in advance in a storage area or the like of an image forming apparatus and may be provided to a print client that cooperates with the image forming apparatus.

A print preset suitable for use by a user may differ from one user to another depending on a preference of the user or a work in which the user is engaged. To provide improved convenience to users, if print presets for use by respective users are simply stored in the image forming apparatus, the total size of print preset data stored in the image forming apparatus may be enormous. In this case, if all print presets stored in the image forming apparatus are provided to a print client, it may be difficult for a user to find a desired print preset from a large number of print presets.

To handle the above situation, print presets may be allowed to be registered in the image forming apparatus within a range below an upper limit of the number of print presets thereby preventing the settings from becoming complicated. However, a problem in this case is that it is impossible to cover all print presets for use by users.

The present invention has been made in view of at least one of the above problems. It is an object of the present invention to provide a mechanism of storing correspondence information between a user and a print preset and thereby making it possible to appropriately provide a notification of a print preset used by a user to a communication apparatus using a print client. Another object of the present invention is to provide a mechanism capable of appropriately registering a print preset based on an operation by an authenticated user.

SUMMARY OF THE INVENTION

In order to achieve at least one of the above objects, the present invention provides an image forming apparatus including storage means configured to store setting information for collectively setting a plurality of setting contents regarding image formation, registration means configured to, in response to accepting a registration request issued via an operation by an authenticated user for registering the setting information in the image forming apparatus, register the setting information in the storage means such that the stored setting information has a data structure that allows the setting information to be referred to using identification information of the authenticated user, and transmission means configured to, in response to accepting a first acquisition request including identification information of a user from a communication apparatus for acquiring attribute information regarding image formation allowed to be used by the user, acquire setting information used by the user based on the identification information from the setting information stored in the storage means, and transmit the attribute information including the setting information.

Further features of the present invention will become apparent from the following description of exemplary embodiments with reference to the attached drawings.

BRIEF DESCRIPTION OF THE DRAWINGS

Accompanying drawings are included in and form a part of the description, illustrate embodiments of the invention, and together with the description, serve to explain the principles of the invention.

FIG. 6 is a sequence diagram illustrating an example of a processing procedure in an image forming system.

FIG. 7A is a diagram illustrating an example of setting information stored in an MFP 101.

FIG. 7B is a diagram illustrating an example of setting information stored in an MFP 101.

FIG. 7C is a diagram illustrating an example of setting information stored in an MFP 101.

FIG. 8A is a diagram illustrating an example of a request for attribute information and an example of a response.

FIG. 8B is a diagram illustrating an example of a request for attribute information and an example of a response.

FIG. 9 is a diagram illustrating an example of print data generated by a communication apparatus 102.

FIG. 10C is a diagram illustrating an example of a screen displayed on an operation unit of a communication apparatus 102.

FIG. 11A is a diagram illustrating an example of a screen displayed on an operation unit of a communication apparatus 102.

FIG. 11C is a diagram illustrating an example of a screen displayed on an operation unit of a communication apparatus 102.

FIG. 12A is a diagram illustrating an example of a screen displayed on an operation unit of a communication apparatus 102.

FIG. 18 is a flowchart illustrating an example of control of an MFP 101.

DESCRIPTION OF THE EMBODIMENTS

The present invention is described below with reference to embodiments in conjunction with drawings. It should be noted that the following embodiments do not limit the invention defined in the claims. It also should be noted that all combinations of the features described in the embodiments are not necessarily needed to practice the invention.

First Embodiment

Figure 1:
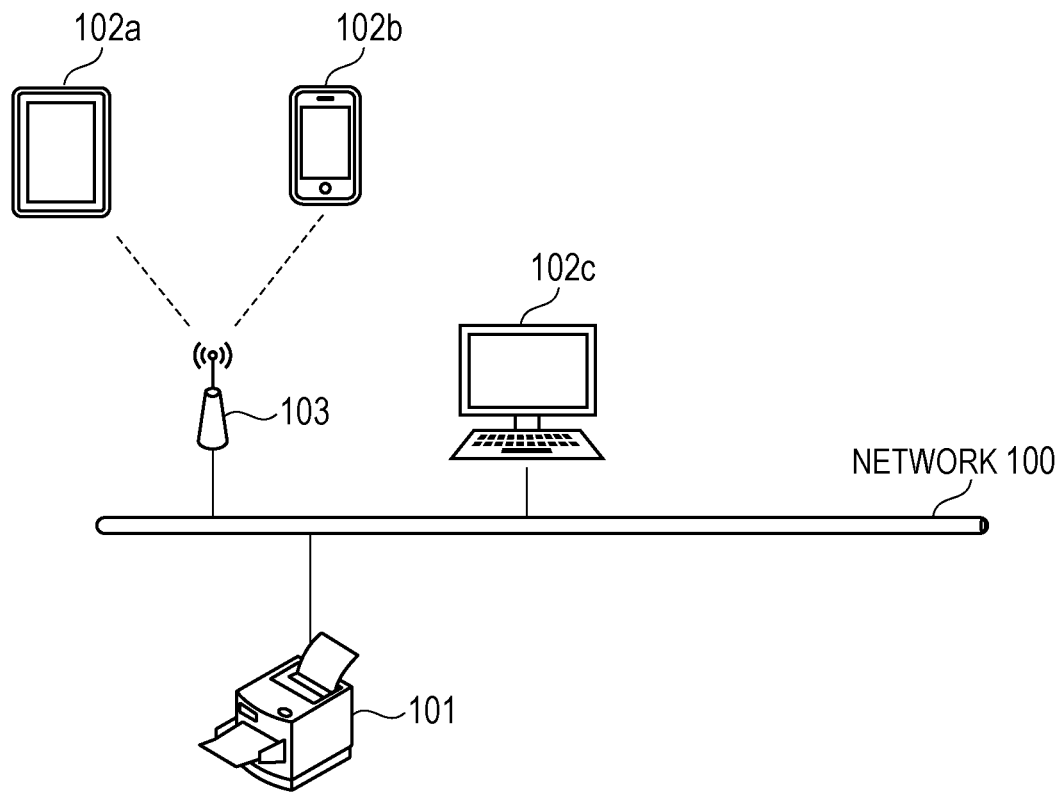
FIG. 1 is a diagram illustrating an example of an image forming system.

First, referring to FIG. 1, a configuration of an image forming system according to the present invention is described below. The image forming system according to the present embodiment includes communication apparatuses 102a to 102c, an MFP (Multi Function Peripheral) 101, and an AP (access point) 103. The MFP 101, the AP 103, and the communication apparatus 102c are connected to a network 100 such that they are allowed to communicate with each other. In the present embodiment, the MFP 101 is described as an example of the image forming apparatus. Furthermore, the communication apparatuses 102a to 102b and the communication apparatus 102c are described as examples of communication apparatuses. In the present embodiment described below, an explanation is given by way of example for a case in which the communication apparatus 102a is a tablet terminal, the communication apparatus 102b is a mobile terminal such as a smartphone, and the communication device 102c is a PC (Personal Computer).

The communication apparatuses 102a and 102b can communicate with the MFP 101 on the network 100 with each other via the AP 103. The communication apparatus 102c is connected to the network 100 via a LAN cable, and thus the communication apparatus 102c can communicate with apparatuses such as the MFP 101 on the network 100. In the present embodiment, the above configuration is described as an example of an image forming system, but the present invention is not limited to this configuration. It is sufficient if at least one communication apparatus and the image forming apparatus are communicatively connected with each other via a network. The communication via the AP 103 is, for example, wireless communication based on the IEEE 802.11 series. Note that the communication apparatus 102 and the MFP 101 may directly communicate with each other by direct wireless communication via an ad hoc network such as Wi-Fi Direct (registered trademark) or Wi-Fi Aware (registered trademark).

First, the MFP 101 will be described. The MFP 101 has a reading function of reading an image on a document and a printing function of printing an image on a sheet. The MFP 101 can execute a printing process based on print data received via the network.

Figure 2:
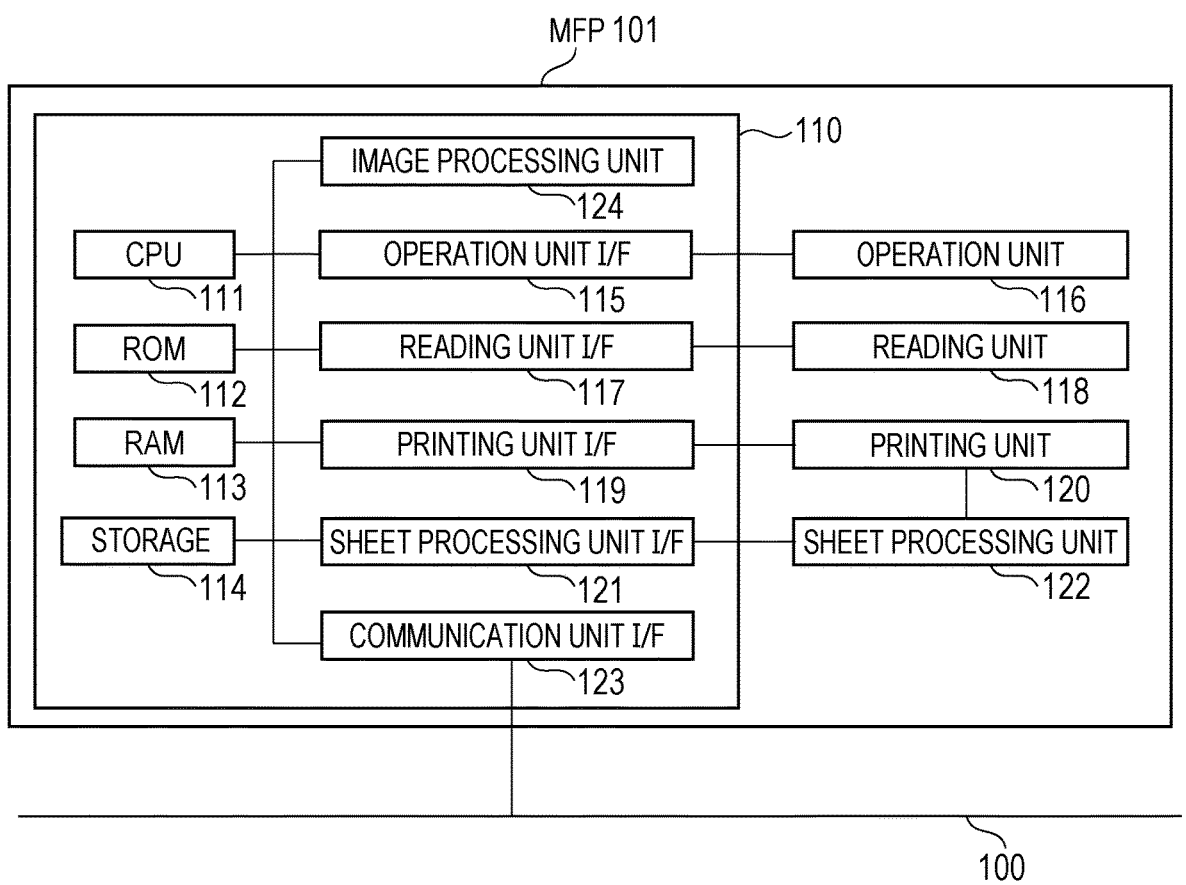
FIG. 2 is a diagram illustrating an example of a hardware configuration of an MFP 101.

FIG. 2 is a diagram illustrating an example of a hardware configuration of the MFP 101. The MFP 101 has a reading function for reading an image on a sheet and a printing function for printing an image on a sheet. In addition, the MFP 101 has other functions such as a file transmission function for transmitting an image to an external communication apparatus.

Although the MFP 101 is described as an example of the image forming apparatus according to the present embodiment, the image forming apparatus is not limited to the MFP 101. For example, present embodiment may be applied to a printing apparatus such as an SFP (Single Function Peripheral) having no reading function may be used.

A control unit 110 including a CPU (Central Processing Unit) 111 controls an operation of the entire MFP 101. The CPU 111 reads out a control program stored in a ROM (Read Only Memory) 112 or a storage 114 and performs various controls such as a print control, a read control, and the like. The ROM 112 stores a control program executable by the CPU 111. A RAM (Random Access Memory) 113 is a main memory used by the CPU 111 as a work area or a temporary storage area in which various control programs are loaded. The storage 114 stores print data, image data, various programs, and various setting information. In the present embodiment, an auxiliary storage device such as an HDD (Hard Disk Drive) is assumed as the storage 114, but a nonvolatile memory such as an SSD (Solid State Drive) may be used instead of the HDD. Note that the above-described hardware units such as the CPU 111, the ROM 112, and the RAM 113 constitute a so-called computer.

In the MFP 101 according to the present embodiment, it is assumed that one CPU 111 executes, using one memory (RAM 113), various processes described later with reference to flowcharts, but the processes may be executed in other manners. For example, various processes described later with reference to the flowcharts may be execute in cooperation among a plurality of CPUs, RAMs, ROMs, and storages. Note that a part of the processes may be executed by using a hardware circuit such as an ASIC (Application Specific Integrated Circuit) or an FPGA (Field-Programmable Gate Array).

An operation unit interface (I/F) 115 connects an operation unit 116 and the control unit 110. The operation unit 116 includes a liquid crystal display unit having a touch panel function, various hard keys, and the like thereby functioning as a display unit for displaying information and a reception unit for receiving an instruction issued by a user.

A reading unit I/F 117 connects a reading unit 118 and the control unit 110. The reading unit 118 reads a document and generates a read image. The generated read image is stored in the storage 114 or the RAM 113. The read image generated by the reading unit 118 is transmitted to the communication apparatus or used for printing the image on a sheet.

The image processing unit 124 includes a RIP (Raster Image Process) that converts print data received via a network into print image data. The image processing unit 124 can also perform a resolution conversion and a correction process on the image. In the present embodiment, it is assumed that the image processing unit 124 is realized by a hardware circuit (such as ASIC or FPGA), but this is by way of example and not limitation. For example, the MFP 101 may include a processor for image processing which may execute an image processing program thereby realizing image processing and print data conversion processing. In this case, flowcharts described later are realized in cooperation between the image processing processor and the CPU 111. Furthermore, the CPU 111 may execute a program for performing image processing to perform image processing and print data rasterization processing. Note that the image processing may be performed by any one of these combinations.

A printing unit I/F 119 connects the printing unit 120 and the control unit 110. The print image generated by analyzing the print data by the image processing unit 124 is transferred from the control unit 110 to the printing unit 120 via the print unit I/F 119. The printing unit 120 receives a control command and the print image via the control unit 110, and prints the image on a sheet fed from a paper feed cassette (not shown) based on the image. A printing method used by the printing unit 120 may be an electrophotographic method or an inkjet method. or may be other printing methods such as a thermal transfer method. A sheet processing unit I/F 121 connects the control unit 110 and a sheet processing unit 122. The sheet processing unit 122 receives a control command from the CPU 111, and performs post-processing on the sheet printed by the printing unit 120 according to the control command. For example, the post-processing performed includes aligning of a plurality of sheets, punching of holes in the sheets, binding of a plurality of sheets, and/or the like. A post-processing function and a post-processing capability of the sheet processing unit 122 are notified to the control unit 110 via the sheet processing unit I/F 121 in advance (for example, when the MFP 101 is started), and the notified information is stored in the storage 114 or the RAM 113.

The control unit 110 is also connected to the network 100 via the communication unit I/F 123. The communication unit I/F 123 transmits an image and information to a communication apparatus on the network 100 and receives print data and information from the communication apparatus on the network 100.

Figure 3:
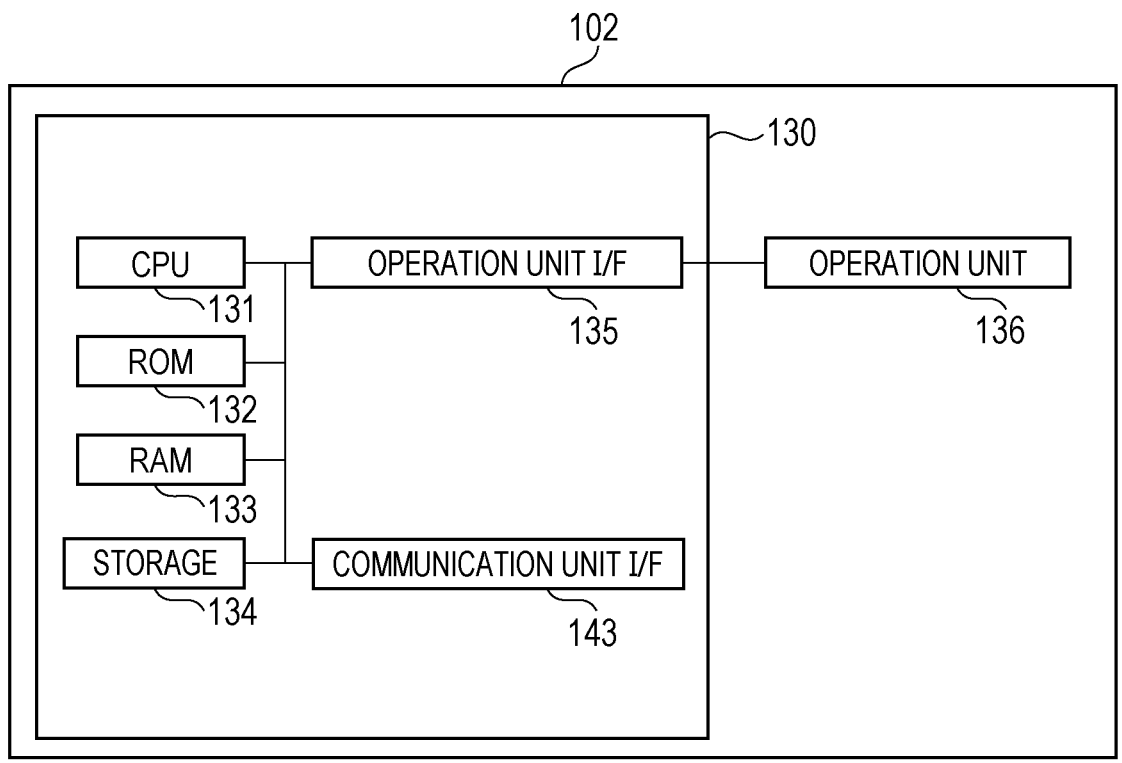
FIG. 3 is a diagram illustrating an example of a software configuration of an MFP 101.

Next, a hardware configuration of the communication apparatus 102 is described with reference to FIG. 3. FIG. 3 is a diagram illustrating the hardware configuration of the communication apparatus 102.

The CPU 131 included in the control unit 130 reads a control program stored in the ROM 132 or the storage 134 and controls the communication apparatus 102.

The control unit 130 includes a CPU 131, a ROM 132, a RAM 133, a storage 134, a communication unit I/F 143, and an operation unit I/F 135, which are connected to a bus.

The CPU 131 is a central processing unit (a processor) that controls an overall operation of the control unit 130. The RAM 133 is a volatile memory, and is used as a work area and a temporary storage area for loading various control programs stored in the ROM 132 and the storage 134.

The ROM 132 is a non-volatile memory, in which a boot program for the communication apparatus and the like are stored. The storage 134 is a nonvolatile flash memory having a larger capacity than the RAM 133. The storage 134 stores a control program for the communication apparatus 102. Furthermore, an OS (Operating System) for controlling the entire communication apparatus 102 and a print client compliant with the IPP (Internet Printing Protocol) are also stored in the storage 134.

The CPU 131 executes the OS program and the print client program loaded in the RAM 133 to control the communication apparatus. Note that the above-described hardware units such as the CPU 131, the ROM 132, and the RAM 133 constitute a so-called computer.

In the communication apparatus 102, it is assumed that one CPU 131 executes various processes described later with reference to flowcharts, but the processes may be executed in other manners. For example, a plurality of processors may cooperate with each other to execute various processes shown in flowcharts described later.

The operation unit OF 135 connects an operation unit 136 and the control unit 130. The operation unit 136 includes a touch panel capable of detecting a touch operation performed by a user, and a display panel that displays various screens. The operation unit 136 functions as a display unit that displays information and functions as a reception unit that receives an instruction issued by a user. Various screens provided by the OS or the print client are displayed on the operation unit 136. The user is allowed to input a desired operation instruction to the communication apparatus 102 by performing a touch operation on the operation unit 136 using an object such as a finger. The operation unit 136 may include a hardware key. In this case, the user is allowed to input an operation instruction to the communication apparatus 102 by pressing the hardware key.

The communication unit I/F 143 is an interface for communicating with the communication apparatus. For example, in a case where the communication apparatus is the tablet terminal 102a or the smartphone 102b, data can be transmitted/received to/from a communication apparatus on the network 100 via the AP 103. In a case where the communication apparatus is the PC 102c, the communication apparatus may be configured to transmit/receive data to/from a communication device on the network 100 via a LAN cable.

As described above, each communication apparatus 102 has a program (also referred to as a print client application program) stored therein for realizing a print client function. It is assumed that the program that realizes the function of the print client is installed in the communication apparatus 102 via an application server (not shown), or the program that realizes the function of the print client is incorporated as a basic function of the OS.

<Software Configuration of MFP 101>

Figure 4:
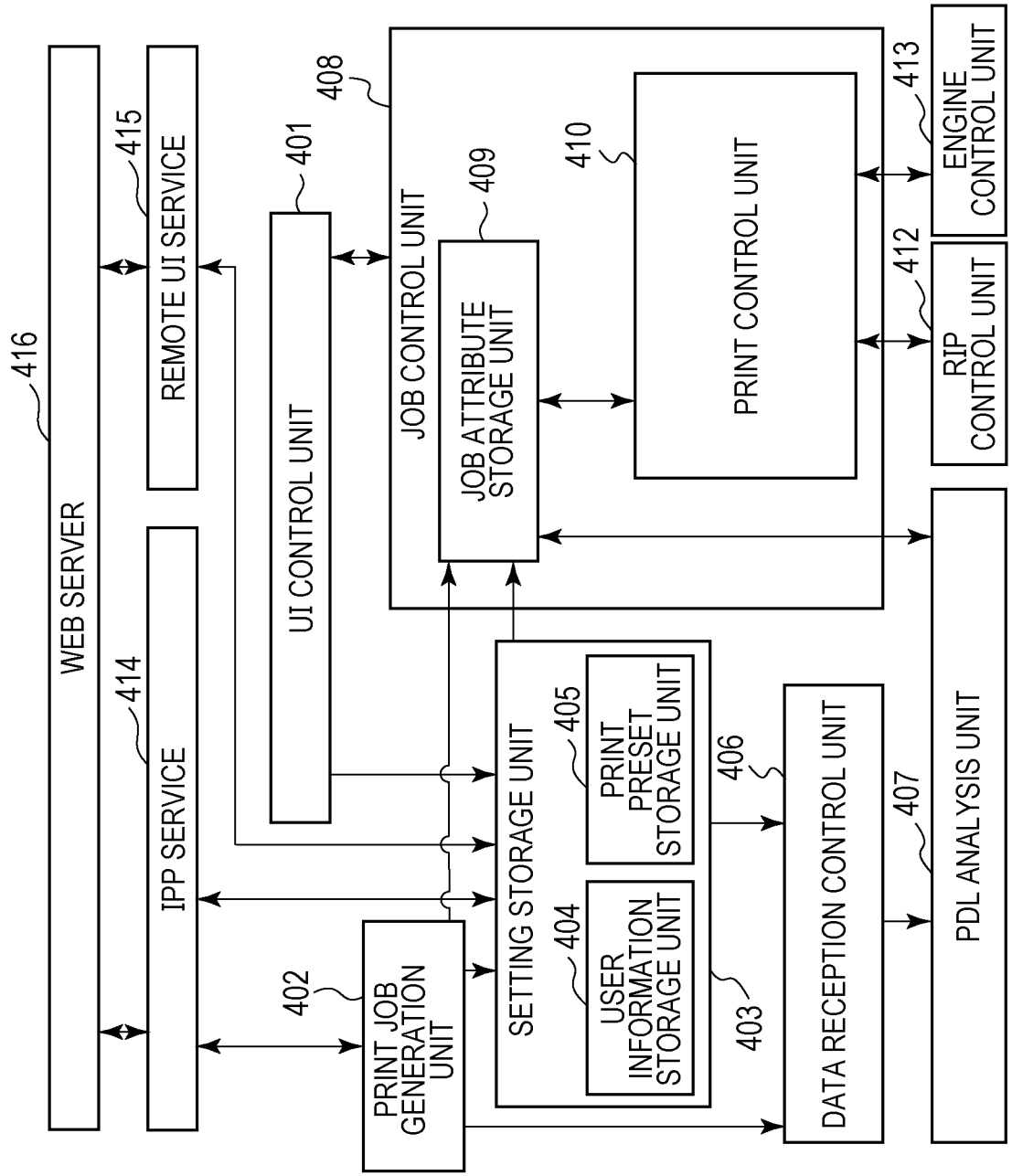
FIG. 4 is a diagram illustrating an example of a hardware configuration of a communication apparatus 102.

FIG. 4 is a diagram illustrating an example of a software configuration of the MFP 101 according to the present embodiment.

The MFP 101 has a web server 416 that provides a web server function and web services (414 and 415) that operate on the web server to provide some service.

When the Web server 416 receives an HTTP request via an HTTP (Hyper Text Transfer Protocol) communication, the Web server 416 assigns the request to a Web service specified by the request and perform control such that the Web service provides the specified service. The Web server 416 determines a Web service to which the request is to be assigned based on the port number and URL (Uniform Resource Locater) included in the request.

The IPP service 414 is a Web service that provides an IPP-compliant Web-based print service to an external terminal such as a communication apparatus. The IPP service 414 has a function of notifying a communication apparatus of attribute information of the MFP 101 (information indicating a print capability and a post-processing capability of the MFP 101 and a print preset), and having a function of receiving print data conforming to the IPP from the communication apparatus and transmitting the received print data to a print job generation unit 402. Furthermore, the IPP service 414 has a function of accepting a print preset registration request from an IPP-compliant print client and registering the print preset in a setting storage unit 403 (details regarding the print preset will be described later).

The remote UI service 415 is a Web service that provides a remote user interface function for executing device setting and management of the MFP 101 via an external Web browser. By using the remote UI service 415 from the web browser or the like of the communication apparatus 102c, a user such as an administrator can check or change various device settings of the MFP 101 on a display of a PC or the like. In the present embodiment, it is assumed that at least changing of the setting relating to the IPP and changing of setting relating to print presets (IPP Presets) can be performed by accessing the remote UI service 415 from the Web browser.

A UI control unit 401 controls a screen displayed on the operation unit 116. For example, the UI control unit 401 acquires information regarding the status of a print job being processed from a job control unit 408, and displays the processing status of the print job on the operation unit 116. The UI control unit 401 is also capable of displaying a screen for registering and managing print presets on the operation unit 116.

The print job generation unit 402 registers a new job in the job control unit 408 based on print data received via the IPP service 414 and issues a request for starting a printing process. Furthermore, the print job generation unit 402 transfers the received print data to the data reception control unit 406.

When the print job is generated by the print job generation unit 402, attributes of the print job are stored in a job attribute storage unit 409.

The user information storage unit 404 stores information regarding a user. The information regarding the user includes authentication information (a credential such as a user ID, a password, or the like) used for authenticating the user, and function information for limiting functions allowed to be used on the MFP 101 for each user.

The print preset storage unit 405 provides functions for managing, updating, referencing, and storing print presets stored in the MFP 101. The IPP service 414 and the remote UI service 415 can refer to or update the print preset stored in the print preset storage unit 405, and can register a new print preset.

The data reception control unit 406 is a buffer area for print data received by the print job generation unit 402, and temporarily stores the received data in the storage 114 for each print job. When the preparation for execution of the specific print job is completed, the job control unit 408 instructs the PDL analysis unit 407 to perform a PDL analysis process on the specific print job. The PDL analysis unit 407 requests the data reception control unit 406 to provide print data corresponding to the specific print job. The data reception control unit 406 transfers the print data corresponding to the specific print job to the PDL analysis unit 407.

The PDL analysis unit 407 generates intermediate data according to attribute information stored in the job attribute storage unit 409 (regarding settings of, for example, the number of copies, Nup, a color mode, post-processing, and/or the like) related to print data corresponding to the specific print job. The generated intermediate data is transferred to a RIP control unit 412. The RIP control unit 412 performs, in cooperation with a RIP provided in the image processing unit 124, a conversion of the intermediate data into a raster image. The print control unit 410 acquires the raster image generated by the RIP control unit 412 and performs a CMYK color separation on the acquired raster image. The print control unit 410 transfers resultant color-separated print image to an engine control unit 413. The engine control unit 413 performs, in cooperation with the printing unit 120 and the sheet processing unit 122, an operation including forming an image on a sheet based on the print image for each CMYK, post-processing such as stapling on sheets after the image has been formed, and/or the like.

<Print Preset>

Next, the print preset is described. In order to provide improved user's convenience in a print client based on IPP, print presets are under discussion in PWG (Printer Working Group). In print presets (IPP Presets) whose specifications are under development by PWG, a name is given to a set of print setting items and print setting values. Use of a print preset makes it possible to collectively reflect, in print settings, values of various setting items (also referred to as setting contents) such as two-sided printing, color setting, stapling setting, and/or the like, and thus a high convenience can be provided to a user.

In the present embodiment, print presets are stored in advance in a storage area such as the print preset storage unit 405 or the like of the image forming apparatus, and provided to a print client that operated in cooperation with the image forming apparatus. An IPP-compliant print client can acquire the print preset from the MFP 101 and use it for print settings on the client side.

A print preset suitable for use by a user may differ from one user to another depending on a preference of the user or a work in which the user is engaged. For example, a user who frequently prints handouts for a presentation may want to use a print preset such as "A4, 2in1, double-sided, and stapling at two positions on a long sided of sheets". On the other hand, for example, a user who frequently prints a drawing may want to use a print preset such as "A3, monochrome, single-sided, no post-processing".

To provide improved convenience to users, if the print presets that respective users want to use are simply stored in the image forming apparatus, the total size of print preset data stored in the image forming apparatus may be enormous. In this case, even if the print presets are provided to a print client, it may be difficult for a user to find a desired print preset from a large number of print presets.

By setting an upper limit on the number of print presets that can be registered in the image forming apparatus, it may be possible to avoid the above difficulty in operation. However, in this case, a problem may occur that a resultant reduction in the number of print presets that can be registered may cause it difficult to cover all print presets desired by users.

In view of at least one of the above-described problems, the present embodiment provides a mechanism in which correspondence information indicating a correspondence between a user and a print preset is stored, and a print preset used by a user is properly notified to a communication apparatus using a print client. In addition, the present embodiment provides a mechanism that allows it to appropriately register a print preset based on an operation by an authenticated user.

Figure 5:
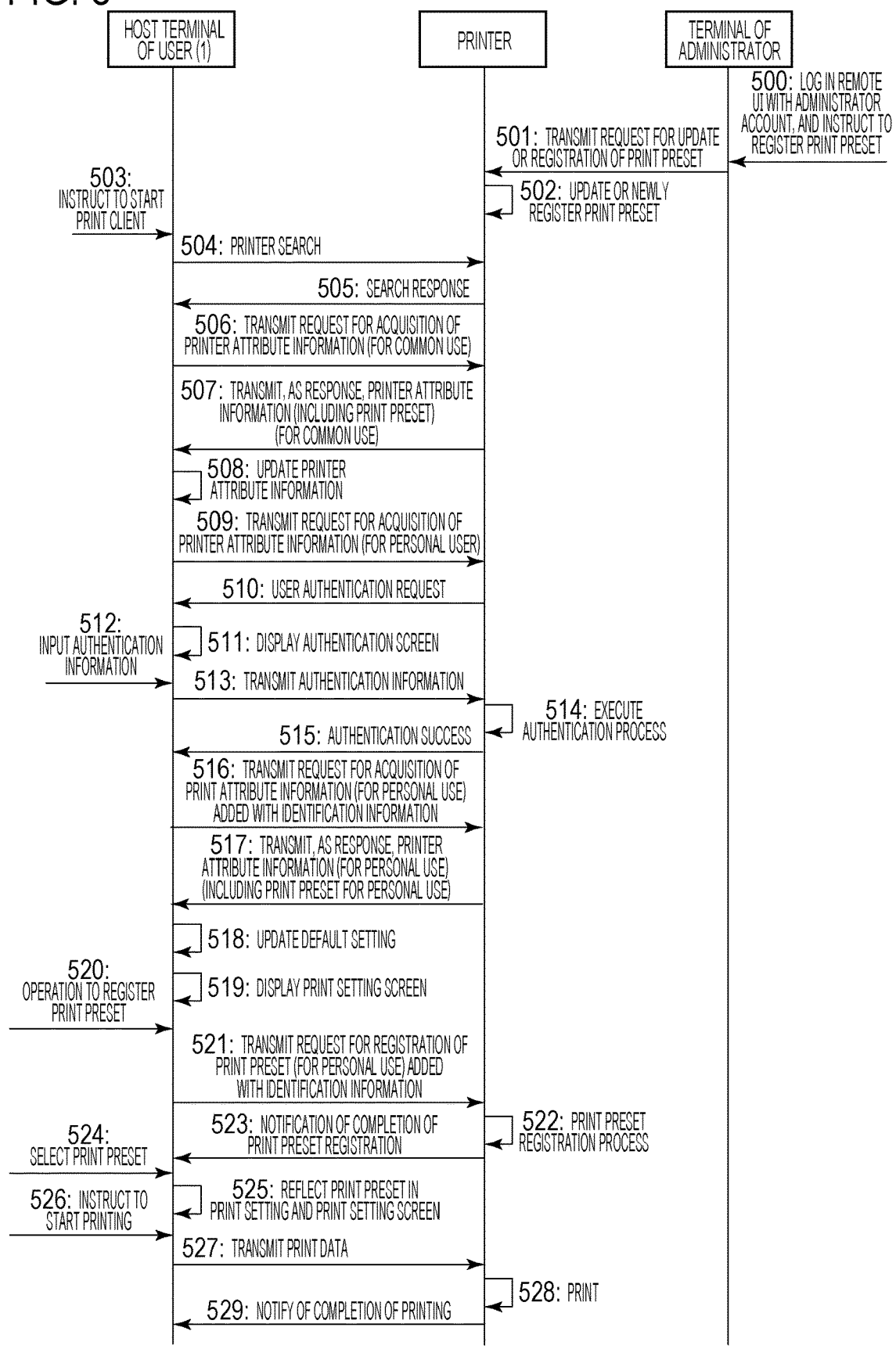
FIG. 5 is a sequence diagram illustrating an example of a processing procedure in an image forming system.

The mechanisms of notification, utilization, and registration of print presets according to the present embodiment are described below. FIG. 5 and FIG. 6 are sequence diagrams respectively illustrating an example of communication between the communication apparatus 102 and the MFP 101.

FIG. 5 is a diagram illustrating an example of a sequence in which, by way of example, user authentication is performed with a print client and a print preset customized for each user is acquired and used. On the other hand, FIG. 6 is a sequence diagram illustrating a case where a common print preset is acquired and used without performing user authentication with a print client.

<Print Preset Registration by Administrator>

First, registration management of a common print preset is described. The administrator of the MFP 101 can access a print preset management screen provided by the remote UI service via a Web browser provided on the communication apparatus 102c. The administrator performs setting operations related to print presets via the management screen displayed on the Web browser (500). The communication apparatus 102c transmits a request to update or register a print preset based on the setting operation performed in 500 (501).

Upon receiving the request to update or register the print preset, the remote UI service 415 of the MFP 101 updates the print preset managed by the print preset storage unit 405 or newly registers the print preset in the storage unit 405 (502).

Figure 10A:
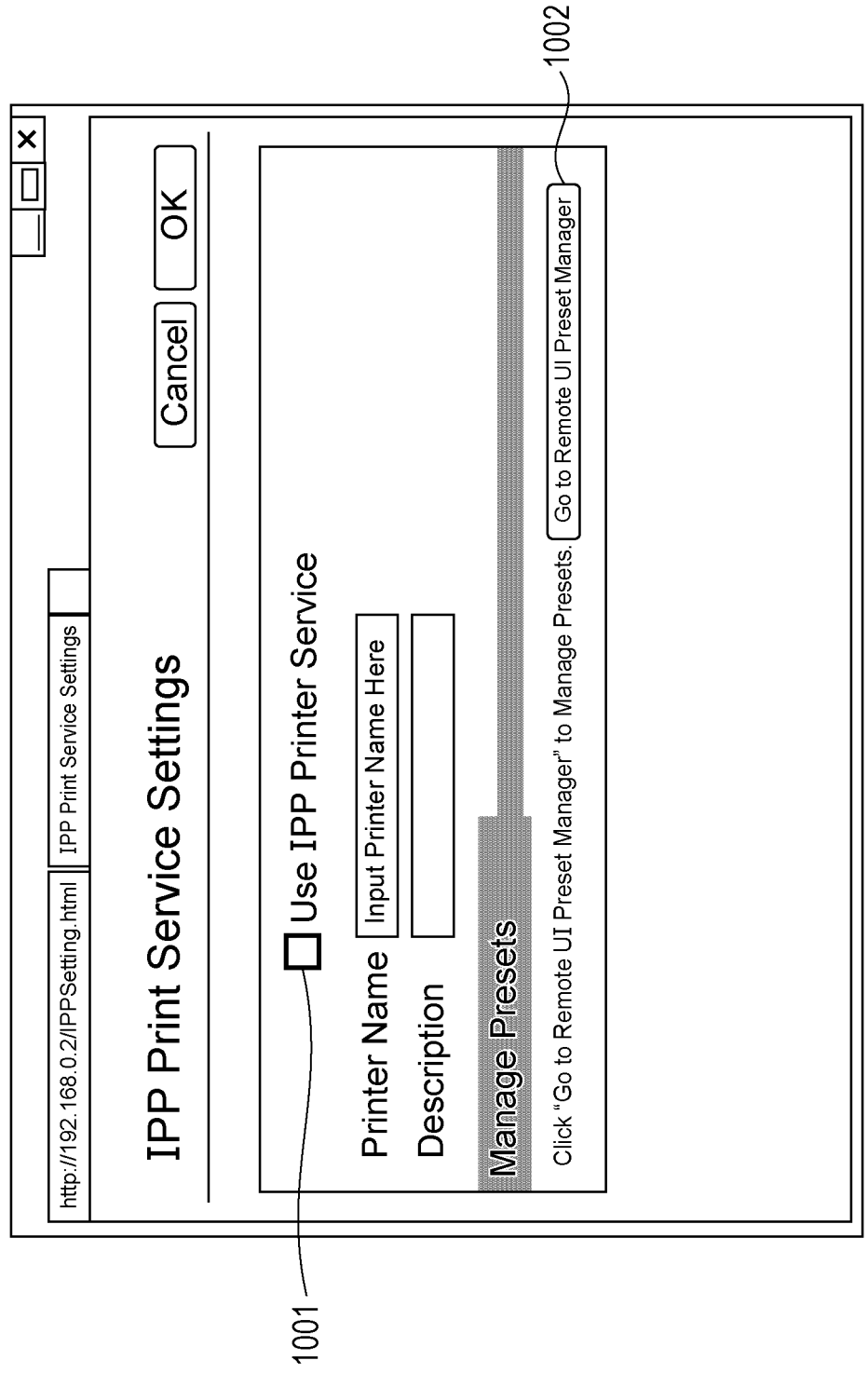
FIG. 10A is a diagram illustrating an example of a screen displayed on an operation unit of a communication apparatus 102.
Figure 10B:
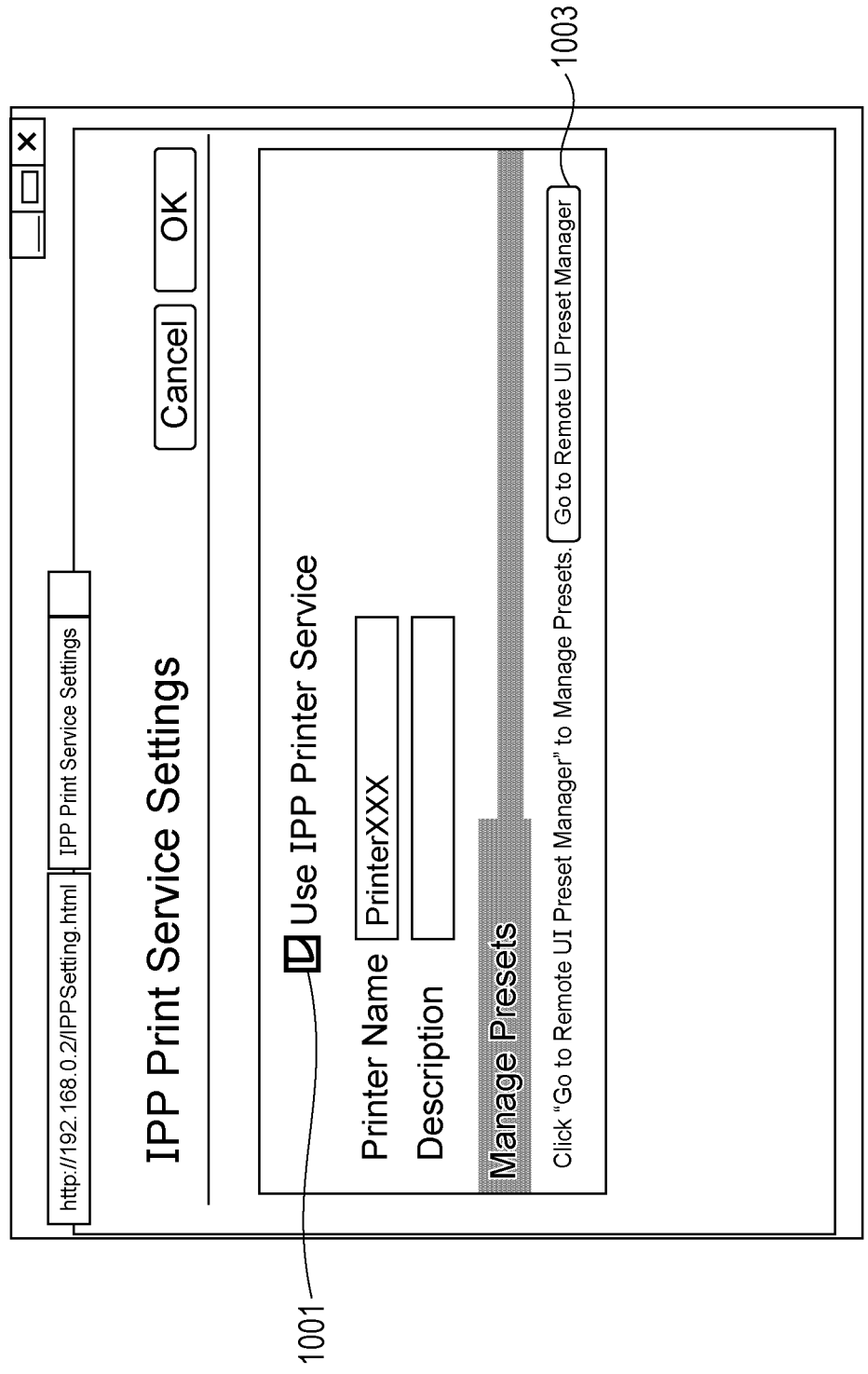
FIG. 10B is a diagram illustrating an example of a screen displayed on an operation unit of a communication apparatus 102.

Next, the management of print presets using the remote UI service 415 is described with reference to FIGS. 10A to 10C. FIGS. 10A to 10C are diagrams illustrating examples of a screen displayed on the operation unit 136 of the communication apparatus 102 based on a Web page provided by the remote UI service 415. FIGS. 10A to 10C illustrate examples of setting screens after login authentication for a user having administrative authority is performed via a login screen (not shown). A user having administrator authority is allowed to perform various device settings via a screen provided by the remote UI service 415. FIGS. 10A and 10B exemplify setting screens regarding IPP printing in work setting of the MFP 101. In the present embodiment, the screen is configured such that the setting screen for IPP printing can be transitioned to a print preset registration screen.

FIG. 10A is a setting screen for a case where the device setting of the MFP 101 is set such that IPP printing is not used. A display item 1002 is a key for making a transition to the print preset registration screen. When the setting is made such that the IPP printing is not used, it is not necessary to register a print preset to be used in the IPP, and thus the item 1002 is grayed out. In addition, inputting in input fields such as a printer name field and a description field are also configured be disabled.

It should be noted that the form of the Web page displayed in the case where the IPP printing is not limited to the examples described above. For example, a Web page provided may not include a display item corresponding to 1002, a label of "Manage Presets", a description thereof.

A user is allowed to change the setting of whether or not to perform IPP printing by selecting a check box of a display item 1001. Upon receiving an HTTP request generated by a change instruction issued by the user, the remote UI service 415 returns a web page corresponding to a screen shown in FIG. 10B to the communication apparatus 102c. Furthermore, the remote UI service 415 changes the device setting of the MFP 101. More specifically, a setting that does not use IPP printing (that does not allow IPP printing) is changed to a setting that uses IPP printing.

A web browser of the communication apparatus 102c draws a screen illustrated in FIG. 10B based on a web page received as the response to the HTTP request. When the setting is changed as a result of the above process such that the IPP printing is used by the MFP 101, the display item for registering the print preset in terms of IPP is enabled. An effect of this process is to further emphasize that print presets is allowed to be set.

In the present embodiment, the description has been given above for the case where the screen transitions from FIG. 10A to FIG. 10B in cooperation with the remote UI service 415. But this is by way of example and not limitation. For example, a script can be executed on the Web browser of the communication apparatus 102 to dynamically switch between displaying the display item 1002 and displaying the display item 1003. A display item 1003 shown in FIG. 10B is a key for transitioning to a print preset registration screen. As illustrated in FIG. 10B, the display item 1003 is displayed in a normal state (without being grayed out). Upon receiving an HTTP request generated as a result of selecting the display item 1003 by a user, the remote UI service 415 returns a web page corresponding to a screen shown in FIG. 10C to the communication apparatus 102c. FIG. 10C includes an area 1004 indicating a name of a print preset, a button 1005 for editing the print preset, and a button 1006 for deleting the print preset. An administrator is allowed to register print presets commonly used on the MFP 101 via the management screen shown in FIG. 10C. For example, in order to reduce the printing cost, a print preset specifying, for example, "2in1, double-sided, monochrome" may be pre-registered, and a user may be prompted to use this print preset. Although not shown explicitly in FIG. 10C, the administrator can also register, edit, and delete a print preset registered by an authenticated user via the management screen.

The print preset registered in the registration process described above with reference to FIGS. 10A to 10C is stored in the print preset storage unit 405. FIGS. 7A to 7C are diagrams for explaining the relationship between the information stored in the print preset storage unit 405 and the user. Setting items 701 are setting items included in a print preset. Attribute values 702 are values of respective items defined in each print preset.

In the present embodiment, in addition to the name 703 and the setting items 706 constituting the print preset, the item 704 and the item 705 for storing the identification information for determining the print preset used by the user are provided. The item 704 is a field in which to describe information for identifying whether the print preset is common or not, that is, whether it is a standard preset or a personal preset. In this field, "standard" or "user" is described. The item 705 is a field for identifying an owner of the print preset. That is, in this field, owner of the print preset is described. The standard preset is allowed to be referred to by any user, and thus "Guest" is stored in the item 705. On the other hand, identification information for identifying a user is stored in the personal preset. Using these items 704 and 705 makes it possible to narrow down the print presets to be sent to the print client.

In the present embodiment, a user identifier (user ID) is registered in association with a personal preset thereby making it possible to identify an owner of a print preset, but this is by way of example and not limitation. For example, when a plurality of users are managed in association with a group, the print preset may be stored for each group. This modification is described below with reference to FIGS. 7B and 7C. FIG. 7C shows examples of items of a user DB used when user authentication is performed on the MFP 101. In this example, a user having a user ID "Suzuki" belongs to an "Accounting" group, and users having user IDs "Tanaka" and "Sato" belong to a "Sales" group. The user DB may be stored in the MFP 101 or in an authentication server (not shown). In a case where the user DB is stored in authentication server, the authentication server performs user authentication in response to receiving a user authentication request.

In the present modification, as shown in FIG. 7B, a personal preset is registered in association with a group identifier 707. By associating a user with a print preset used by the user in this manner, it becomes possible for each group to share a print preset, although granularity of customization is reduced as compared with a case where a personal preset is used. Users belonging to the same group are often involved in the same business. For example, it is very likely that users belonging to the "Sales" group often print handouts to be presented to customers. In such a case, a print preset may be shared in a group. A setting as to whether a print preset is associated with a group or a user may be made in advance as a device setting of the MFP 101. These device settings are stored in the storage 114 or the like. In this case, the MFP 101 may change the setting depending on the usage environment as to whether a personal preset is registered for each user or a group preset is registered for each group according to the setting stored in the storage.

The print preset storage unit 405 stores information in a format such that it is allowed to refer to a print preset based on information that identifies a user. A data structure used herein may be a relational database or NoSQL.

<Acquisition of Print Preset>

Referring again to FIG. 5, a cooperation with a print client is described. A user of the communication apparatus 102 performs a user operation to start a print client via the operation unit 136 of the communication apparatus 102 (503). When the communication apparatus 102 accepts the user operation to start the print client, the communication apparatus 102 broadcasts a search request for searching for a printer or an image forming apparatus located in the vicinity (504). For example, the search request can be issued using mDNS (Multicast Domain Name Service) or the like. Not that this operation is performed in a case where no printer is registered. In a case where usable printers are registered in advance, a screen is transitioned in S19 to a print setting screen.

Upon receiving the search request, the MFP 101 transmits a response to the search (505). When the communication apparatus 102 receives the response from the printer such as the MFP 101, the communication apparatus 102 transmits a request for acquiring a printer attribute information including information indicating capability of the user, a print preset for common use, and/or the like (506). In a case where a plurality of printers are found, or in a case where a confirmation as to the printer is to be made, a selection screen (not shown) may be displayed such that a request may be transmitted to a printer selected via this selection screen.

Here, it is assumed that the communication apparatus 102 uses a Get-Printer-Attributes command defined in IPP to transmit the acquisition request to the MFP 101. For simplification of description, printer attribute information including information indicating a printer capability, a print preset for common use, and/or the like will be referred to as attribute information (for common use) or common attribute information. Note that the MFP 101 may issue common attribute information of a version in which functions are limited for use by a guest user.

When the MFP 101 receives the Get-Printer-Attributes request for acquiring the printer attribute information, the MFP 101 transmits the attribute information of the MFP 101 as a response to the request (507). The attribute information acquired based on the acquisition request is described below with reference to FIGS. 8A and 8B. FIG. 8A shows an example of information 801 transmitted as an acquisition request and an example of attribute information 802 obtained as a response to the acquisition request.

The attribute information 802 includes capability information indicating the capability of the MFP 101 in terms of printing and post-processing, and also includes preset information 804 used as standard preset information. The MFP 101 generates capability information based on information indicating capabilities of the MFP 101 (for example, supported color modes, paper types, post-processing, etc.). Furthermore, the capability information includes information as to whether or not it is supported to limit or customize functions for each user. In a case where the device setting of the MFP 101 specifies that a user authentication function is enabled, the MFP 101 describes in the capability information that it supports the operation for limiting or customizing functions for each user. On the other hand, in a case where it is set that the user authentication function is not used, the capability information includes no description indicating that the operation is supported. For example, "Get-User-Printer-Attributes" is used as the operation for limiting or customizing the functions for each user.

Based on the print presets stored in the print preset storage unit 405, preset information 804 including a list of print presets for common use is generated. The MFP 101 transmits the attribute information (for common use) 802 including the generated capability information and the preset information to the communication apparatus 102.

Again referring to FIG. 5, in response to receiving the attribute information (for common use), the communication apparatus 102 updates the printer attribute information (508). As a result of this processing, it becomes possible for the print client of the communication apparatus 102 to display the print setting screen suitable for the printer capability and to use the received print preset for use by a guest.

In a case where a returned response indicates that "Get-User-Printer-Attributes" is supported, control in the following sequence is performed as described below. Note that in a case where the returned response indicates that "Get-User-Printer-Attributes" is not supported, the communication apparatus 102 skips processes in 509 to S18 and proceeds to a print setting sequence (in S19 and following steps).

Subsequently, the communication apparatus 102 transmits a request to the MFP 101 for acquiring printer attribute information including information as to restriction and customization of functions for each user (509). Note that it is assumed here that a Get-User-Printer-Attributes command, the specification of which is being developed by the PWG, is used to transmit, to the MFP 101, the acquisition request to acquire the printer attribute information including the function restriction information and customization information for each user. Hereinafter, for the sake of simplification of description, printer attribute information including information on a restriction of functions and customization information for each user is referred to as attribute information (for personal user) or personal attribute information.

When the MFP 101 receives the acquisition request for the attribute information (for personal use), the MFP 101 transmits a user authentication request by HTTP. The authentication request may be issued, for example, using known BASIC authentication or Digest authentication. In this authentication process, a data flowing through a communication path may be encrypted by TLS (using IPPS). Note that in a case where an authentication session is established between the MFP 101 and the communication apparatus 102, the processes from S10 to S15 are skipped. The MFP 101 temporarily stores, in the RAM 113 or the storage 114, a user ID as a session variable associated with a session ID for managing the session. This makes it possible to identify the user which has transmitted the request including the session ID. Furthermore, based on the session ID, it is possible to determine that the function restriction information or the customization information to be transmitted is information defined for the specific user. That is, in the present embodiment, the session ID included in the request received from the communication apparatus 102 is used as identification information for identifying the user.

Figure 11B:
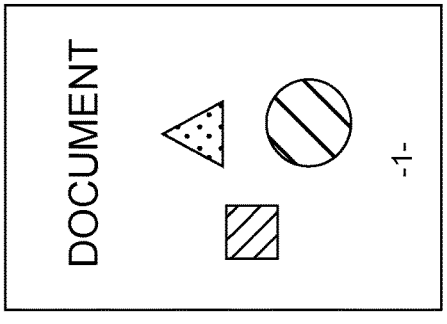
FIG. 11B is a diagram illustrating an example of a screen displayed on an operation unit of a communication apparatus 102.

When the communication apparatus 102 receives the authentication request, the displays communication apparatus 102 displays an authentication screen (S11). The authentication screen explained by way of example with reference to a screen illustrated in FIGS. 11A to 11D. FIGS. 11A to 11D illustrate examples of screens provided by a print client of a PC serving as the communication apparatus 102c. FIG. 11A shows an example of an authentication screen displayed at S11. Dialog 1101 is for inputting user information.

In a case where a user wants to use a print preset customized for personal use or functions restricted for personal use, the user inputs authentication information (a user name and a password) in input fields 1102 and 1103, and presses an OK button 1104 (S12). In a case where a user wants to use the MFP 101 with the guest authority, the user presses a guest key 1105 or a cancel key.

When the input of the authentication information is accepted and pressing of the OK button is detected, the communication apparatus 102 transmits authentication information to the MFP 101 (S13). When the MFP 101 receives the authentication information, the MFP 101 executes an authentication process based on the received authentication information (S14). Hereinafter, the description is given by way of example for a case where a user having a user ID "Suzuki" has been successfully authenticated.

When the authentication is successfully passed, the MFP 101 transmits information including information indicating that the authentication has been successfully passed, the session ID, and the user ID to the communication apparatus 102 (S15). After that, the session ID can be used to identify the user of the communication apparatus as long as the session is being effectively managed. The communication terminal 102 stores the received user ID and session ID in the storage 134 or the like.

Subsequently, the communication apparatus 102 transmits an acquisition request, to the MFP 101, for acquiring printer attribute information (for personal use) including identification information (S16).

In the present embodiment, it is assumed that the user authentication is performed using the Digest authentication or the BASIC authentication, but this is by way of example and not limitation. An access token may be given to the print client using Oauth or the like. In this case, an acquisition request for acquiring printer attribute information (for personal use) including an access token is transmitted to the MFP 101.

When the MFP 101 receives the acquisition request for the printer attribute information (for personal use) including the identification information (session ID), the MFP 101 identifies the user who transmitted this acquisition request based on the identification information. Furthermore, based on the function restriction information for this user and a personal print preset allowed to be used by this user, the MFP 101 generates attribute information (for personal use) including preset information. Finally, the generated attribute information (for personal use) is transmitted to the communication apparatus 102 as a response to the request transmitted at S16 (S17).

The attribute information acquired based on the acquisition request for the attribute information (for personal use) is described below with reference to FIG. 8B. FIG. 8B shows an example of information 805 transmitted as an acquisition request for the attribute information (for personal user) and an example of attribute information 806 obtained as a response to the acquisition request. Although not shown in 805, an extension header of the acquisition request (HTTP request) includes a session ID as identification information. Information 808 is preset information indicating a print preset associated with "Suzuki" who is a user authenticated via the processes from S12 to S15. More specifically, "My preset-1", "My preset-2", and "My Preset-3" described above with reference to FIGS. 7A and 7B are added. In the present embodiment, the attribute information 806 that does not include common preset information is transmitted at this timing, but this is by way of example and not limitation. In addition to the personal preset information, common preset information may be added to the attribute information 806, and the resultant attribute information 806 may be transmitted.

When the communication apparatus 102 receives the attribute information (for persona use), the communication apparatus 102 updates a default setting of the print client. Furthermore, the communication apparatus 102 also updates available print presets (S18).

Via the above-described sequence of flow, the attribute information for each user and the print preset customized for each user is reflected in the setting of the print client.

Upon completion of the sequence of initial settings, the communication apparatus 102 displays a print setting screen. FIG. 11B shows an example of the print setting screen after the initial settings are completed.

<Registration of Print Preset Via Print Client>

A list 1106 is a display item used to make settings relating to print presets. By using options displayed in the list 1106, a user is allowed to perform operations such as newly registering or updating a print preset for the MFP 101, reacquiring the print preset, and newly registering the print preset in the print client.

FIG. 11C shows an example of a screen displayed on the operation unit 136 in response to selection of the list 1106 in FIG. 11B.

A list of print preset-related functions is displayed in a pull-down list displayed in an area 1107. Functions related to each print preset are described below.

An option 1108 is an option selected as a default print preset in an IPP print setting in the communication apparatus 102c. An option 1109 is an option for resetting the print preset used in the previous time.

In addition, the present embodiment provides a mechanism for selecting a frequently-used print preset in short steps without traversing many hierarchical layers. An option 1110 is a shortcut key for easily setting a frequently-used print preset. Note that the present embodiment exemplifies a case where there is only one option, but this is by way of example and not limitation. For example, a plurality of frequently used print presets (for example, three print presets) may be displayed. In this case, preset names are displayed as labels of the respective options such that options can be distinguished by the preset names.

An option 1111 is an option for generating a print preset based on a current print setting and registering it in the print client. An option 1112 is an option, unlike the option 1111, for registering the current print setting in a communication destination printer (for example, the MFP 101). When it is detected that the option 1111 or 1112 is selected, the screen transitions to a screen shown in FIG. 11D where it is allowed to input a new preset name. An input field 1117 for inputting a preset name is displayed on the screen in FIG. 11D, which allows a user to set the preset name. When an OK key is pressed, the print preset registration process is performed (details will be described later).

An option 1113 is an option for displaying all currently available print presets. Here, all print presets include a print preset stored locally (in a print client) and a print preset acquired from a printer such as the MFP 101. An option 1114 is an option used to newly create a print preset. In this case, for example, a print preset can be newly created via a setting wizard (not shown).

An option 1115 is an option used to reacquire a common preset. When the option 1115 is selected, the communication apparatus 102 executes processing similar to that from 506 to 508 described above with reference to FIG. 5 to update the print preset. The processing based on the option 1115 is different from the processing from 506 to 508 in that only the acquired print preset is updated and the capability information of the printer is not updated.

An option 1116 is an option used to reacquire a personal preset stored in the MFP 101. When the option 1116 is selected, the communication apparatus 102 executes processing from 509 to S18 described above with reference to FIG. 5 to update the print preset.

Referring again to FIG. 5, the print preset registration processing is described. The user performs a print preset registration operation via the screen shown in FIG. 11B or the like (520). When the communication apparatus 102 detects that a user operation for registering a print preset in the MFP 101 is performed, the communication apparatus 102 transmits a registration request for registering the print preset including identification information (session ID) (521). Here, it is assumed that the print preset registration is requested using a Set-User-Printer-Attributes command that is under development by the PWG. Note that the above description is by way of example and not limitation. A command for the same purpose or a similar purpose whose specifications are being discussed by a working group or the like may be used.

When the MFP 101 receives the print preset registration request, the MFP 101 executes registration processing (522). Here, if a print preset with the same name is stored in association with the user specified based on the identification information, control is performed to update the print preset. In a case where there is no print preset with the same name, a new print preset is registered in association with the user. In a case where the print preset is associated with a group as shown in FIGS. 7B and 7C, the print preset is registered in association with a group ID to which the user belongs. If the number of personal presets allowed to be created reaches a predetermined upper limit (for example, five), an error notification may be issued without registering the print preset. Note that the processing performed when the upper limit is reached is not limited to the example described above. For example, names of already-registered print presets may be notified to the user, and the user may select an unnecessary print preset. A new print preset may be registered in place of the selected unnecessary print preset.

When the registration process in 522 is completed, the MFP 101 transmits a completion notification (523). Via the process described above, it is possible to accept the registration of the print preset from the IPP-compliant print client.

<Using Print Preset>

Next, use of a print preset is described. The user performs an operation of selecting a print preset from the pull-down list shown in FIG. 11C or a print preset list screen (not shown) (524). When the communication apparatus 102 detects the selection operation, the communication apparatus 102 updates the print settings based on the combination of the print setting items and the print setting values stored in association with the selected print preset. The print setting is reflected in the print setting screen displayed on the operation unit 136 (525). Here, it is assumed by way of example that "My preset-1" described above with reference to FIG. 7A or FIG. 7B is selected.

Figure 11D:
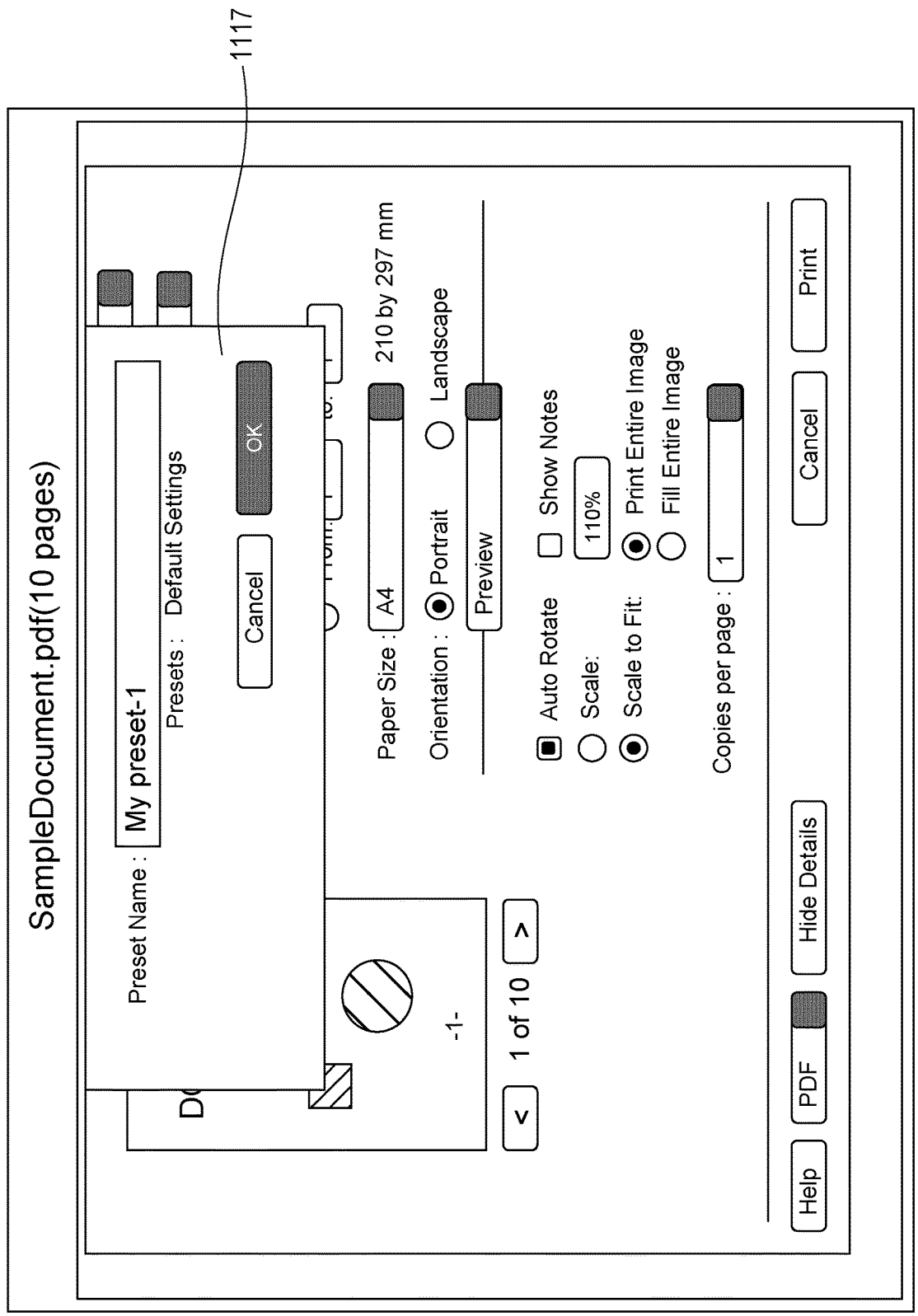
FIG. 11D is a diagram illustrating an example of a screen displayed on an operation unit of a communication apparatus 102.

The user performs a print start operation via the screen shown in FIG. 11D (526). When the communication apparatus 102 detects the print start operation, the communication apparatus 102 generates print data based on the current settings and transmits the generated print data to the MFP 101 (527). FIG. 9 is a diagram for explaining attribute information of print data generated in response to the print start operation performed after selecting "My preset-1". As shown in 901, the print attribute such as "color, double-sided, stapled at one position at upper left" based on the print settings updated by "My preset-1" is reflected in the generated print data. In a case where a further print setting is performed by the user after the print preset is selected, the resultant setting is reflected in the generated print data. As shown in FIG. 9, the attribute information of the print data is added with the name of the user who requests printing. This name is added based on the user ID which is stored when authentication is successfully passed in S15. The information indicating the user ID added to the attribute information of the print data is used as necessary, for example, when the MFP 101 manages the number of printed sheets for each user, or when it is verified whether the print data satisfies the function limitation for each user.

Subsequently, the MFP 101 executes printing based on the received print data (528). When the execution is completed, the MFP 101 notifies the communication apparatus 102 of an execution result of the job (529).

A sequence diagram shown in FIG. 6 is for explaining a process performed when a user performs an operation for requesting guest use via the screen shown in FIG. 11A. Processes from 603 to 611 are the same as the processes from 503 to 611 shown in FIG. 5, and thus a further description thereof is omitted. When a user wants to use the MFP 101 with the guest authority, the user performs an operation of selecting the guest key 1105 shown in FIG. 11A. When the communication apparatus 102 detects the operation of selecting the guest key 1105, the communication apparatus 102 notifies the MFP 101 that the use with the guest authority is selected (613). When the notification is completed, the communication apparatus 102 transitions the screen displayed on the operation unit 136 to the print setting screen (614). Thus, in the case where the use with the guest authority is selected, the acquisition of the attribute information (for personal use) can be skipped. Following processes from 624 to 629 are the same as the processes from 524 to 529 shown in FIG. 5, and thus a further description thereof is omitted.

The sequences in FIG. 5 and FIG. 6 have been described above by way of example with reference to the screen (FIGS. 11A to 11D) provided by a print client of a PC used as the communication apparatus 102c. However, in a case where the communication apparatus 102 is a smartphone or a tablet terminal, the configuration of the screen of a print client thereof may be appropriately modified taking into consideration a screen size and a touch operation. Even for a print client conforming to IPP, the screen configuration differs depending on the type of the client. An example of a modification of the screen display on a print client of a smartphone or a tablet terminal is described below with reference to FIGS. 12A to 12G. Note that a description of display items that bring about similar effects as the functions described above with reference to FIGS. 11A to 11D is omitted.

<Displaying Screen on Smartphone and Tablet Terminal>

Modified screens are described below appropriately referring to a process in the sequence diagram shown in FIG. 5. FIG. 12A illustrates a menu screen provided by the OS of the communication apparatus. The menu screen is a function provided by the OS. The menu screen can be called from various applications (for example, a memo application) and used for transmitting a message, email, or the like, and for performing printing.

Figure 12B:
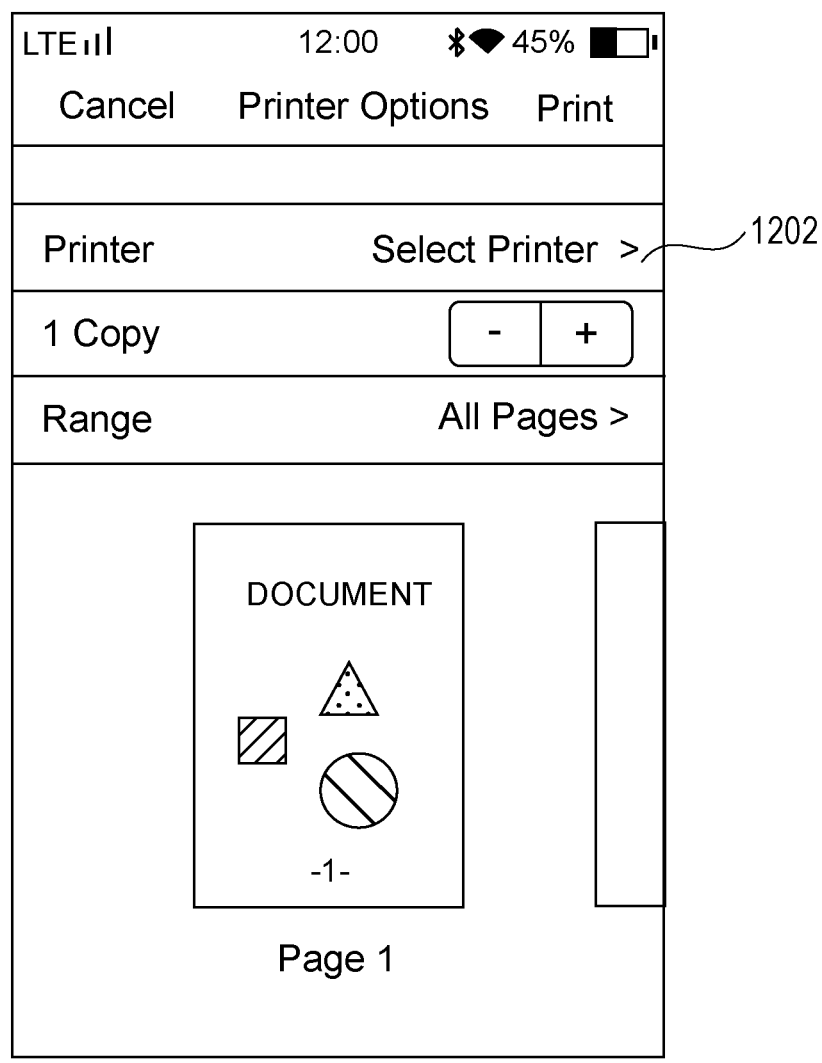
FIG. 12B is a diagram illustrating an example of a screen displayed on an operation unit of a communication apparatus 102.

When the communication apparatus 102 detects an operation of pressing a print key 1201, the communication apparatus 102 transitions to the print setting screen shown in FIG. 12B. The print client generates a preview image based on the data to be printed received from various applications and displays the preview image as shown in FIG. 12B.

Figure 12C:
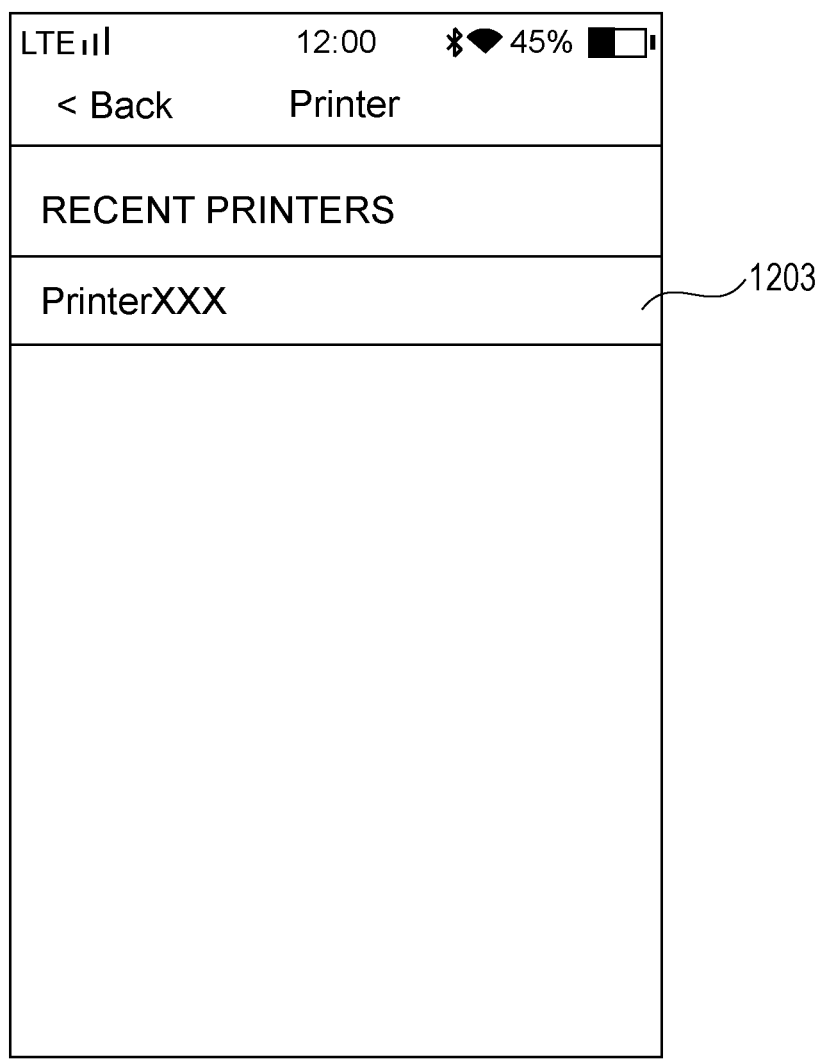
FIG. 12C is a diagram illustrating an example of a screen displayed on an operation unit of a communication apparatus 102.

FIG. 12B illustrates, by way of example, a case where no printer is selected. When the communication apparatus 102 detects that an option 1202 is selected, the communication apparatus 102 transitions to a screen for executing a printer search process and starts the printer search request indicated by 504. FIG. 12C illustrates an example of a screen on which a search result is displayed. Note that in the example in FIG. 12C, it is assumed by way of example that a search response is returned from the MFP 101, and an IPP printer name "PrinterXXX" of the MFP 101 included in the search response is displayed as a search result.

Figure 12D:
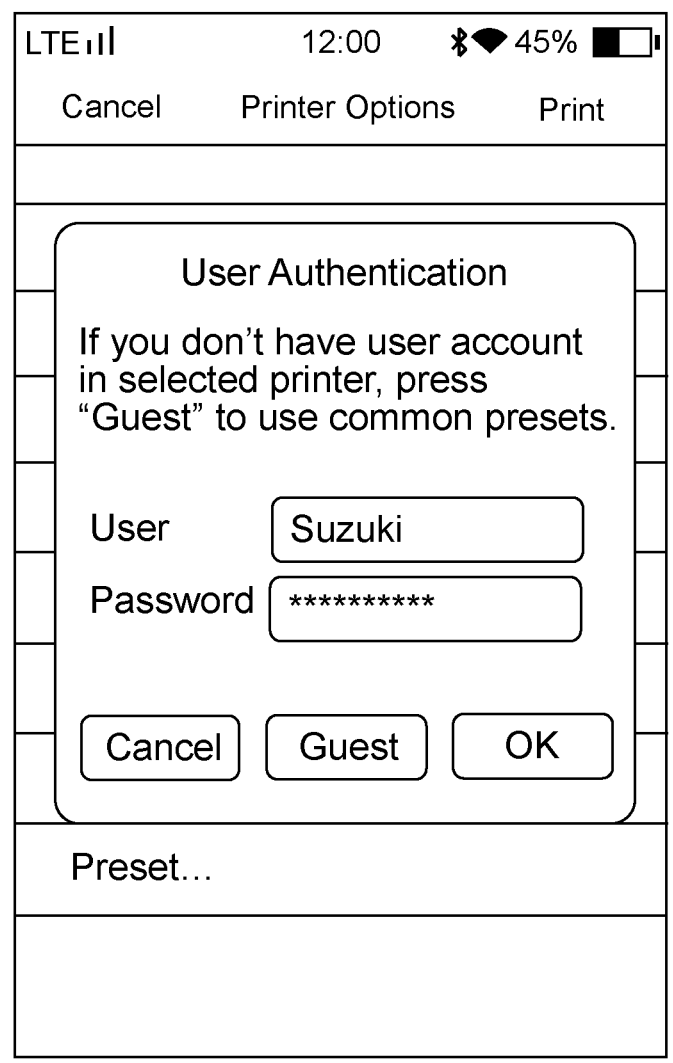
FIG. 12D is a diagram illustrating an example of a screen displayed on an operation unit of a communication apparatus 102.
Figure 12E:
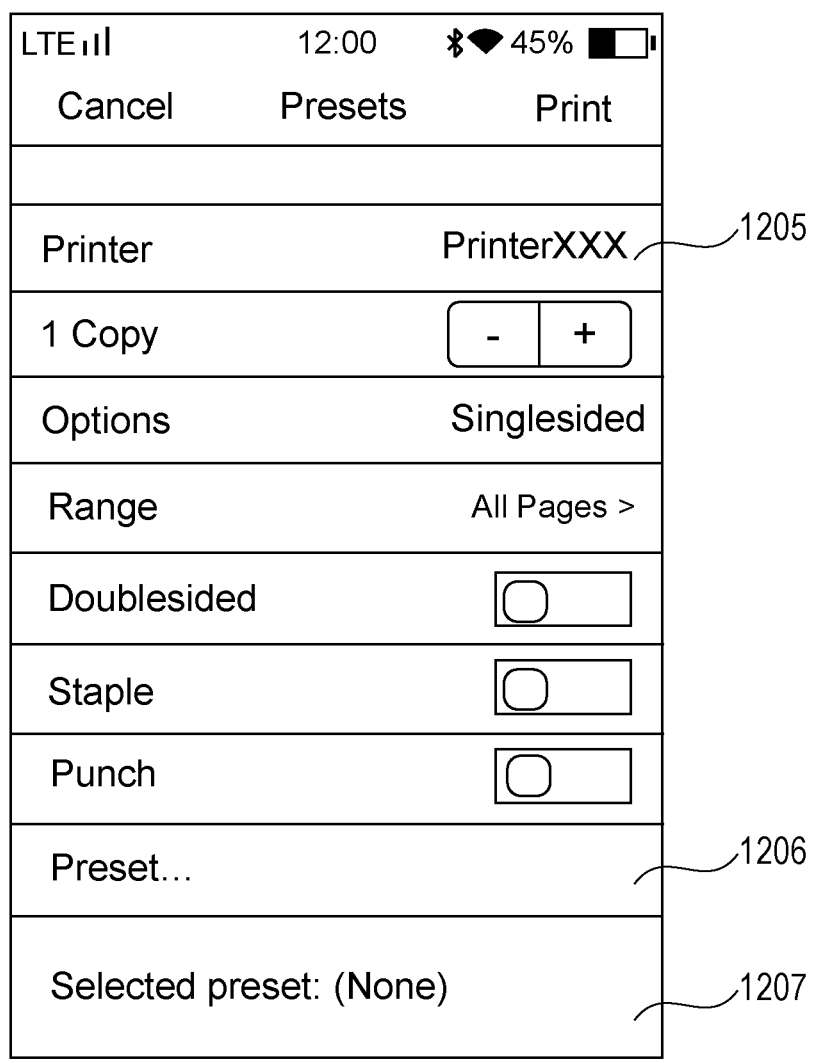
FIG. 12E is a diagram illustrating an example of a screen displayed on an operation unit of a communication apparatus 102.

When the communication apparatus 102 detects that an option 1203 in FIG. 12C is selected, the communication apparatus 102 executes a process in 506 and subsequent processes in FIG. 5. An authentication screen shown in FIG. 12D is similar to that shown in FIG. 11B, and thus a further description thereof is omitted. FIG. 12E illustrates an example of a print setting screen displayed in a process S19.

An option 1206 is an option for selecting a print preset. An area 1207 is for displaying information indicating the selection status of the print preset. FIG. 12E illustrates an example in which no print preset is set.

Figure 12F:
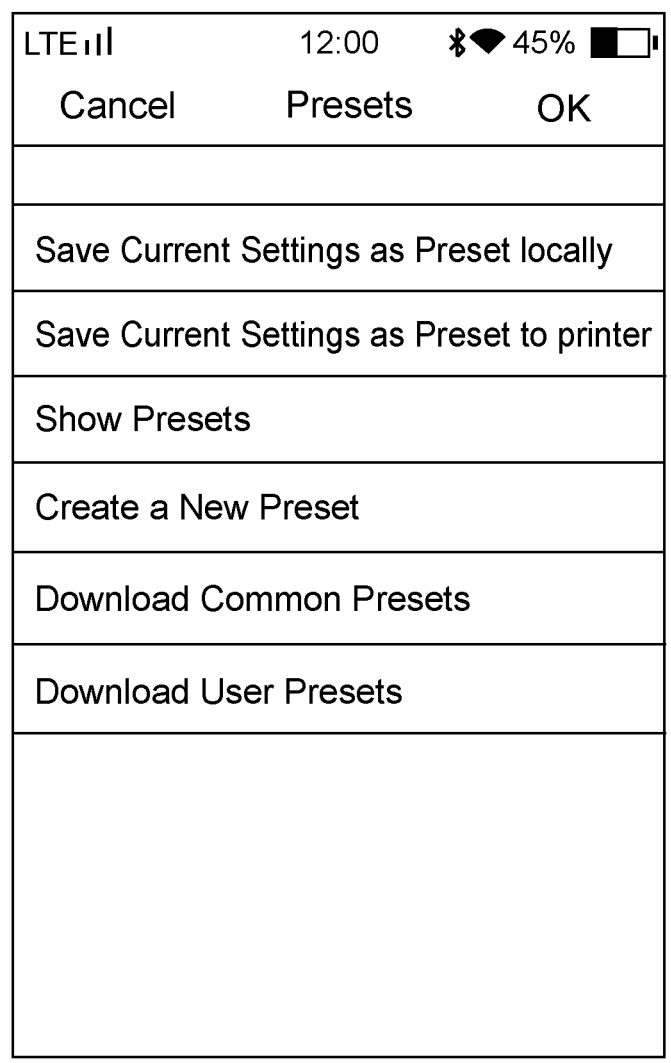
FIG. 12F is a diagram illustrating an example of a screen displayed on an operation unit of a communication apparatus 102.

When the communication apparatus 102 detects that an option 1206 is selected, a screen regarding a print preset in FIG. 12F is opened. In a case where the communication apparatus is a smartphone, a tablet device, or the like, the display area is limited, and thus the drop-down list is not convenient. To handle the above situation, when any one of items is selected, a single setting screen for only the selected item is opened thereby providing convenience to the user. The process executed by the user via the screen in FIG. 12F is similar to that performed in 1107 in FIG. 11C, and thus a further description thereof is omitted.

Note that, in the present embodiment, when the option 1206 is selected, the screen transitions to the screen shown in FIG. 12C. However, this is by way of example and not limitation. When the option 1206 is selected, the communication apparatus 102 may transition to a screen on which a list of print presets is displayed. The list of these print presets is appropriately rearranged according to the frequency of use, etc., and is displayed such that the user is allowed to make a selection in a highly convenient manner. By this processing, it becomes possible to call the print preset more easily and with a less number of operation steps, even on a tablet terminal, a smartphone or the like having a small display area. In this case, a screen for registering or reacquiring the print preset may be displayed such that it can be reached by being transitioned from a screen in another layer (for example, a setting menu screen).

Figure 12G:
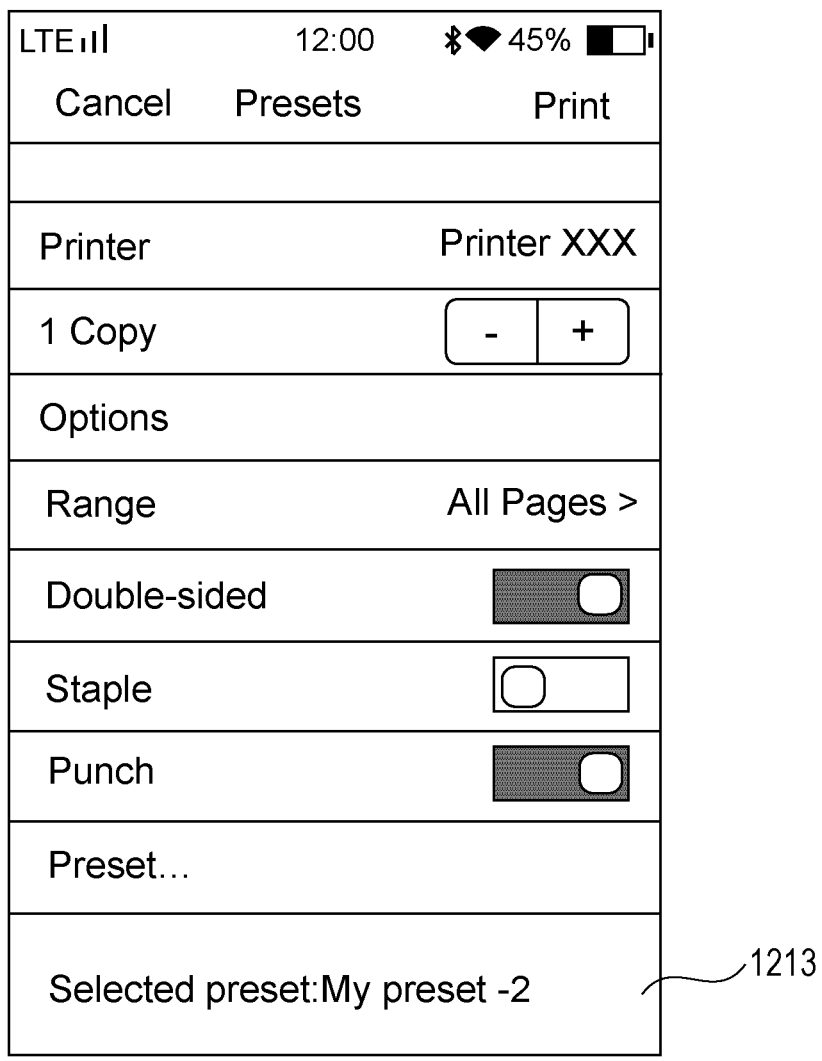
FIG. 12G is a diagram illustrating an example of a screen displayed on an operation unit of a communication apparatus 102.

FIG. 12G illustrates an example of a print setting screen after a print preset is set. Here, by way of example, it is assumed that "My preset-2" is selected. In an area 1213, information indicating that "My preset-2" is selected is displayed. After the user selects a print preset, if the user further modifies the setting, a result may be notified to the user. In this case, for example, a message such as "My preset-2 (Modified)" may be displayed.

Next, a control method for realizing notification, utilization, and registration of print presets according to the present embodiment is described below with reference to flowcharts shown in FIGS. 13 to 18.

<Control of Communication Apparatus 102>

Figure 13:
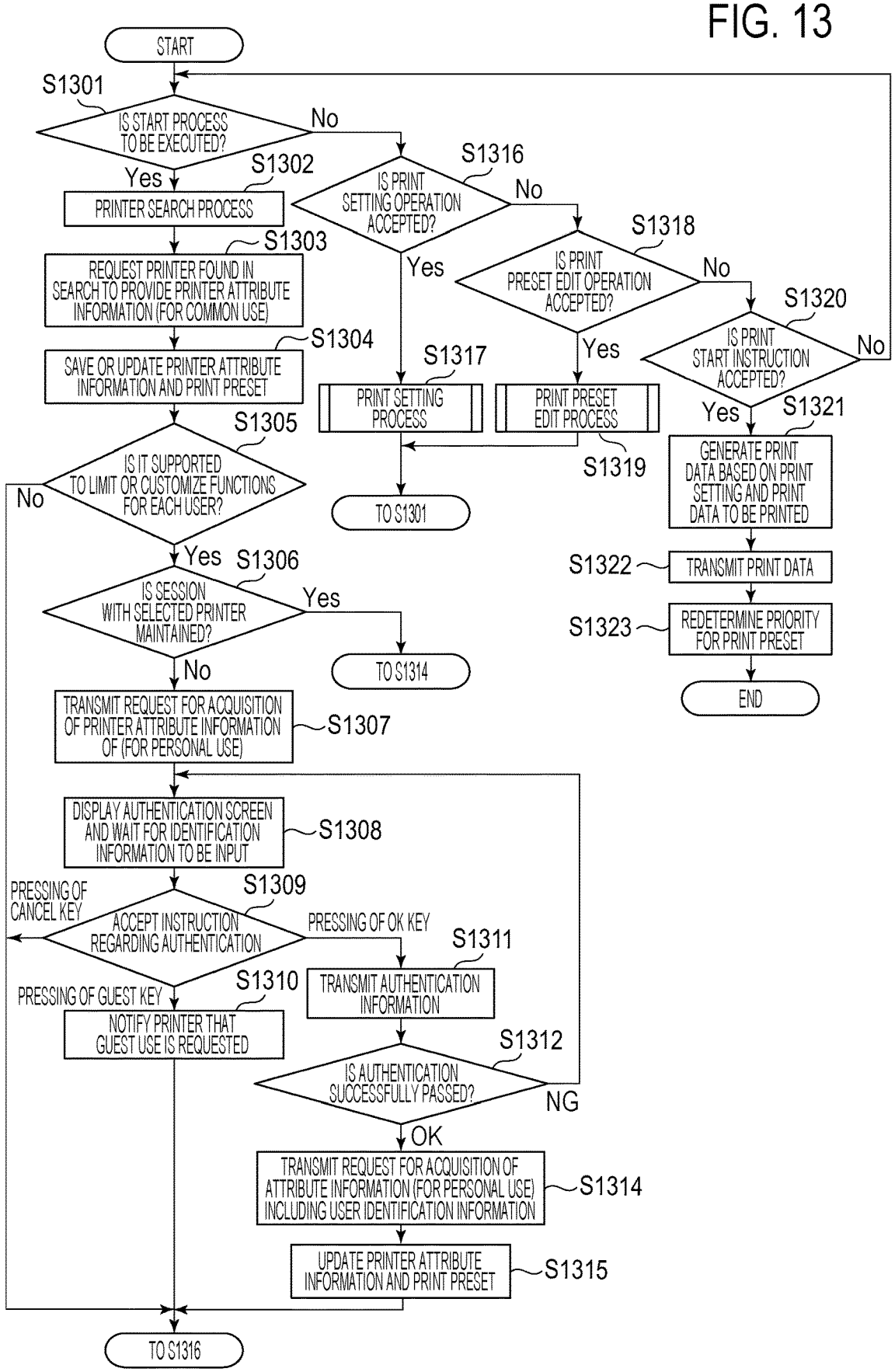
FIG. 13 is a flowchart illustrating an example of control of a communication apparatus 102.
Figure 14:
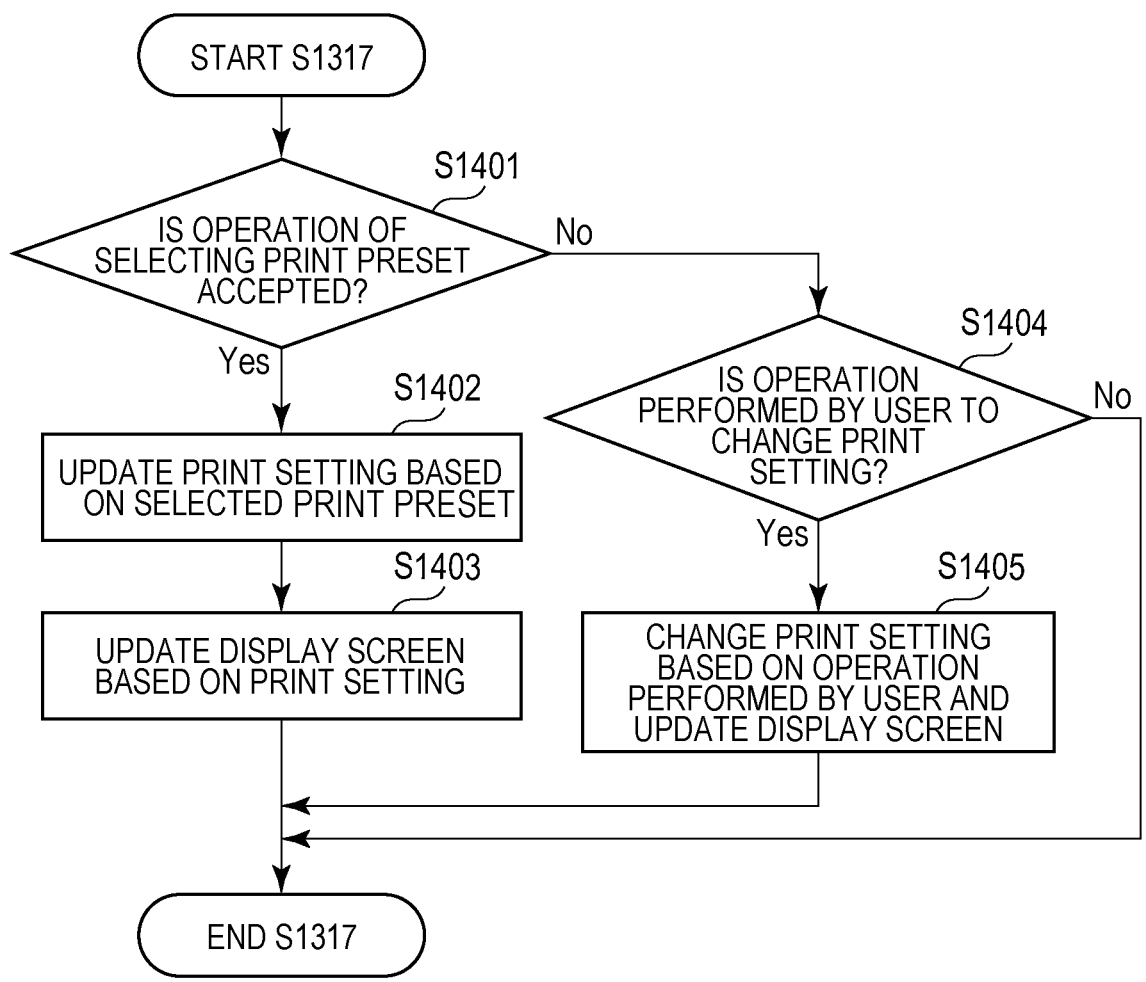
FIG. 14 is a flowchart illustrating an example of control of a communication apparatus 102.
Figure 15:
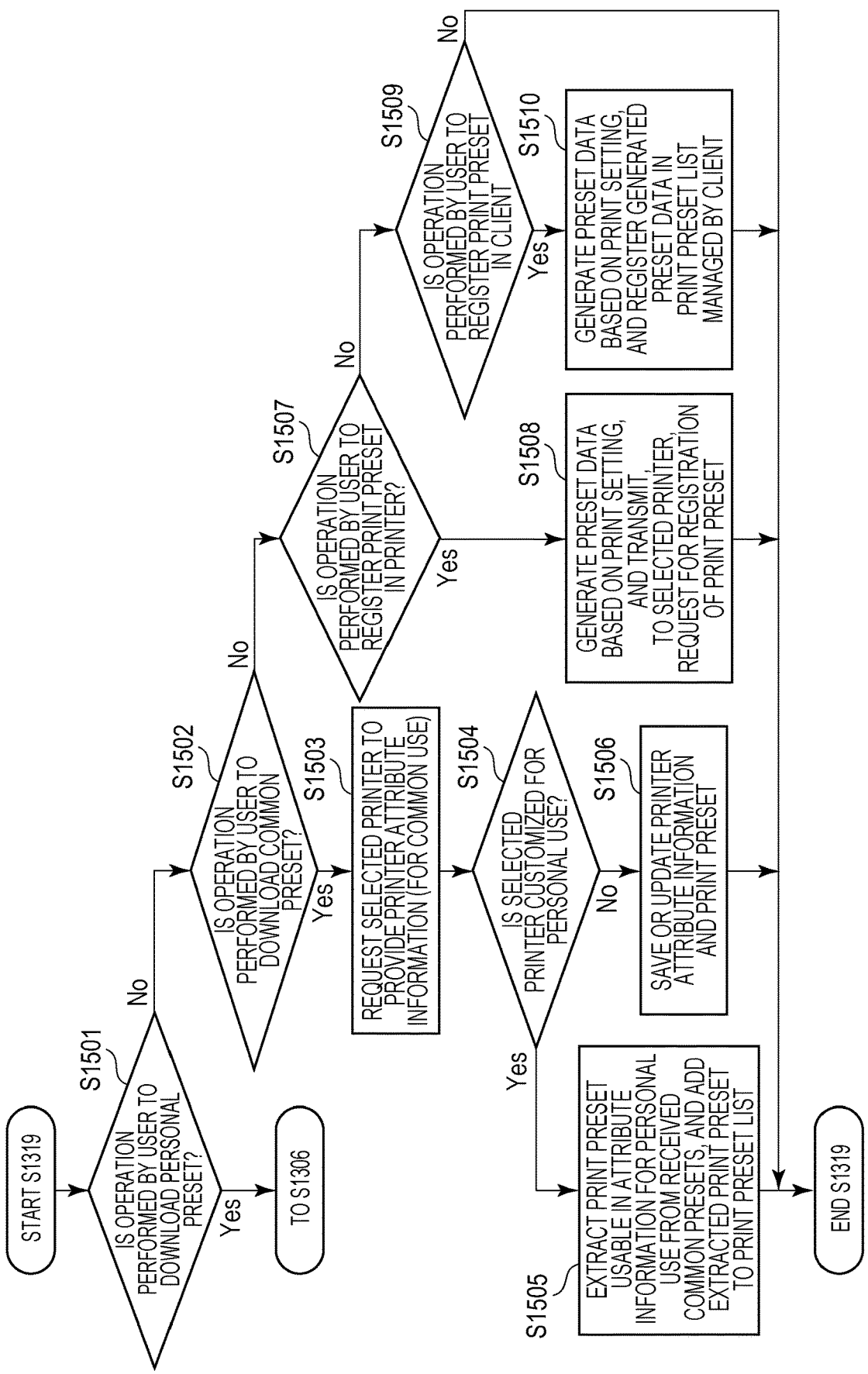
FIG. 15 is a flowchart illustrating an example of control of a communication apparatus 102.

First, the operation of the communication apparatus 102 is described. FIGS. 13 to 15 are flowcharts showing controls of the communication apparatus 102. Each operation (step) shown in the flowcharts of FIGS. 13 to 15 is realized by the CPU 131 by reading a program for realizing each control module stored in the ROM 132 or the storage 134 into the RAM 133 and executing the program. Note that each process shown in the flowcharts is realized by the function provided by the OS 310 in cooperation with a program module for realizing the print client.

The flowchart shown in FIG. 13 illustrates processes executed in response to accepting an operation by a user to start the print client. In S1301, the CPU 131 determines whether to execute a startup process. It is allowed to register a printer, in advance, in a print client used on a PC or the like. In a case where the printer has already been registered in advance, it is determined not to execute an acquisition process at the startup. In a case where it is determined that the startup process is to be executed, the process proceeds to S1302. However, in a case where it is determined that the startup process is not to be executed, the process proceeds to S1316.

In S1302, the CPU 131 transmits a printer search request via the communication unit OF 143. In S1303, the CPU 131 transmits an attribute information (for common use) acquisition request to a printer (for example, the MFP 101) found as a result of the printer search request. Here, it is assumed that the CPU 131 uses the Get-Printer-Attributes command defined in IPP to transmit the acquisition request to the MFP 101. Note that as described above with reference to FIGS. 11A to 11D and FIGS. 12A to 12G, when a plurality of printers are found, the request in S1302 may be transmitted in response to a printer being selected by a user operation.

In S1304, the CPU 131 updates or newly saves printer attribute information and a print preset based on the attribute information obtained as a response to the request transmitted in S1303. Here, in a case where there is already a saved print preset whose value of the attribute of Name and whose value of the attribute of Owner are the same as those of the received print preset, the CPU 131 updates the saved print preset with a new print preset. On the other hand, in a case where either the value of the attribute of Name or the value of the attribute of Owner does not match, the print preset is newly saved.

In S1305, the CPU 131 determines whether or not the printer supports function restriction or customization for each user based on the attribute information received in S1304. In a case where the function restriction or the customization for each user is supported, the process proceeds to S1306. However, in a case where the function restriction or the customization for each user is not supported, the process proceeds to S1316.

In S1306, the CPU 131 determines whether or not the session with the other party is maintained. In a case where the session is maintained, the authentication process in S1307 to S1312 is skipped and the process proceeds to S1314. On the other hand, in a case where the session with the other party is not maintained, CPU 131 advances the process to S1307.

In S1307, the CPU 131 transmits a request for acquisition of printer attribute information (for personal use) to the communication apparatus being in communication. Here, it is assumed that the CPU 131 transmits the acquisition request to the MFP 101 using a command such as Get-User-Printer-Attributes, which is under development by the PWG. At the timing when S1306 is executed, the session with the communication partner is not yet established, and thus the acquisition request including no identification information (session ID) is transmitted. As a response to this request, the printer such as the MFP 101 transmits the user authentication request described in S10 in FIG. 5.

In S1308, in response to the user authentication request received as a response to the request in S1307, the CPU 131 displays an authentication screen for inputting authentication information and accepts an input operation of authentication information. As for the authentication screen, for example, the user information input screen shown in FIG. 11A or FIG. 12D is used.

In S1309, the CPU 131 determines the type of the instruction regarding the authentication. In a case where a cancel key is selected, the CPU 131 advances the process to S1316. In a case where a guest key is selected, the process proceeds to S1310. In a case where an OK key is selected, the CPU 131 advances the process to S1311.

In S1310, the CPU 131 notifies the printer that it is a guest use, and advances the process to S1316.

In S1311, the CPU 131 transmits the authentication information accepted in S1308 to the printer (for example, the MFP 101). Upon receiving the authentication information, the MFP 101 performs the authentication described in S14 in FIG. 5 and notifies the communication apparatus 102 of the result.

In S1312, the CPU 131 determines whether or not the authentication result based on the authentication information transmitted in S1311 is successful. In a case where the authentication is successful, the process proceeds to S1314. However, in a case where the authentication is not successful (the authentication fails), the process returns to S1308 and waits for an input operation of the authentication information to be performed again. In the case where the authentication is successful, session establishment processing is performed. As a result of the session establishing process, the communication apparatus 102 receives a session ID from the printer (the MFP 101) being in communication.

In S1314, the CPU 131 transmits a request for acquisition of printer attribute information (for personal use) including identification information (the session ID) to the printer being in communication. At the timing when S1314 is executed, the session with the communication partner has already been established, and thus the acquisition request including identification information (the session ID) described in an HTTP extension header is transmitted. Upon receiving the acquisition request for the attribute information (for personal use) including the identification information (the session ID), the printer (the MFP 101) being in communication responds to the acquisition request by returning the attribute information (for personal use) of the printer described above in S17 in FIG. 5.

In S1315, the CPU 131 updates the printer attribute information and the print preset based on the attribute information (for personal use) obtained as the response to the request in S1314. In accordance with having saved in the print client the print preset whose value of the attribute of Name and whose value of the attribute of Owner are the same as those of the received print preset, the CPU 131 updates the saved print preset with the new print preset. On the other hand, in a case where either the value of the attribute of Name or the value of the attribute of Owner does not match, the print preset is newly saved.

Subsequently, in S1316, the CPU 131 determines whether or not an operation related to print settings is accepted. In a case where the operation related to the print setting is accepted, the process proceeds to S1317. However, in a case where the operation related to the print setting is not accepted, the process proceeds to S1318. Note that the operation relating to the print setting is, for example, a print preset selecting operation, a print setting changing operation (for example, changing from color to monochrome), etc.

In S1317, the CPU 131 executes a print setting process. The print setting process is described in detail below with reference to a flowchart shown in FIG. 14. In S1401, the CPU 131 determines whether a print preset selection operation is accepted. In a case where the print preset selection operation is accepted, the process proceeds to step S1402. However, in a case where the print preset selection operation is not accepted, the process proceeds to step S1404.

In S1402, the CPU 131 updates the print setting based on the selected print preset. For example, in a case where the selected print preset is "My preset-1", the setting such as "color, two-sided printing, stapling the product at one position in the upper left corner" are reflected in the print setting. In S1403, the CPU 131 updates the display screen based on the current print setting. Upon completion of updating the display screen, the process proceeds to S1301. In a case where the user has already set the print setting before the print preset is selected, the user may be notified that the currently set print settings will be discarded. In this case, the CPU 131 makes an inquiry to the user via the operation unit 136 as to whether OK or cancellation is selected. In a case where it is detected that OK is selected, changing of the print setting is performed in S1402. In a case where cancel is selected, the process proceeds to S1301 without changing the setting based on the print preset.

In S1404, the CPU 131 determines whether or not a user operation for changing a print setting is accepted. In a case where a user operation to change a print setting is accepted, the process proceeds to step S1405. However, in a case where a user operation to change the print setting is not accepted, the process proceeds to step S1301.

In S1404, the CPU 131 reflects the change of the print setting based on the user operation and updates the display of the operation screen according to the change. When the change and update process is completed, the process proceeds to S1301.

Referring again to FIG. 13, in S1318, the CPU 131 determines whether a print preset editing operation is accepted. In a case where the print preset editing operation is accepted, the process proceeds to S1319. However, in a case where the print preset editing operation is not accepted, the process proceeds to S1320.

In S1319, the CPU 131 performs a print preset editing process based on the print preset editing operation. Here, the print preset editing operation refers to the print preset download operation or the print preset registration operation described above with reference to FIGS. 10A to 10C. The print preset editing operation is described in detail below with reference to a flowchart shown in FIG. 15.

In S1501, the CPU 131 determines whether or not a user operation for downloading a personal preset is accepted. In a case where a user operation for downloading a personal preset is accepted, the CPU 131 advances the process to S1306 to acquire and reflect the print attribute (for personal use) of the printer using a command such as Get-User-Printer-Attributes. On the other hand, in a case where a user operation of downloading a personal preset is not accepted, the CPU 131 advances the process to S1502.

In S1502, the CPU 131 determines whether or not a user operation for downloading a common preset is accepted. In a case where a user operation to download a common preset is accepted, the process proceeds to step S1503. However, in a case where a user operation to download a common preset is not accepted, the process proceeds to step S1507.

In step S1503, the CPU 131 transmits a request for acquiring printer attribute information (for common use) to the printer (for example, the MFP 101) being selected. Upon receiving the request to acquire the printer attribute information (for common use), the printer such as the MFP 101 transmits, as a response, the printer attribute information (for common use).

In S1504, the CPU 131 determines whether or not the attribute information stored in association with the printer being selected is attribute information customized for a user. In a case where the attribute information is customized for a user, the process proceeds to S1505. However, in a case where the attribute information is not customized for a user, the process proceeds to S1506.

In S1505, the CPU 131 extracts a print preset that can be used with a print capability with restricted functions for personal use, based on the print preset included in the received attribute information (for common use). Thereafter, the extracted print preset is registered or updated as a print preset used by the print client. This process is an exceptional process for suppressing a print preset including an attribute that is not allowed to be used with authority given to the user from being set. When the print preset registration or update process is completed, the process proceeds to S1301.

In S1506, the CPU 131 registers or updates the printer attribute information and the print preset based on the received attribute information. When the registration or update is completed, the CPU 131 returns the process to S1301.

In S1507, the CPU 131 determines whether or not a user operation for registering a print preset is accepted. In a case where a user operation for registering a print preset in the printer is accepted, the process proceeds to step S1508. However, in a case where a user operation for registering a print preset in the printer is not accepted, the process proceeds to step S1509.

In S1508, the CPU 131 generates print preset data based on the print settings made via the print setting screen, and transmits a registration request for registering the print preset to the selected printer. It is assumed that the request includes identification information (a session ID). It is also assumed that the print preset registration is requested using a Set-User-Printer-Attributes command that is under development by the PWG. Note that the above description is by way of example and not limitation. A command for the same purpose or a similar purpose whose specifications are being discussed by a working group or the like may be used. When the update process is completed, the process proceeds to S1301.

In S1509, the CPU 131 determines whether or not a user operation for registering a print preset in the client is accepted. In a case where a user operation for registering a print preset in the client is accepted, the process proceeds to step S1510. However, in a case where a user operation for registering a print preset in the client is not accepted, the process proceeds to step S1301.

In S1510, the CPU 131 generates print preset data based on the print settings made via the print setting screen, and registers the print preset data in a print preset list managed by the print client. When the registration process is completed, the CPU 131 advances the process to S1301.

Referring again to FIG. 13, in S1320, the CPU 131 determines whether a print start instruction is accepted. In a case where the print start instruction is accepted, the process proceeds to S1321. However, in a case where the print start instruction is not accepted, the process returns to S1301 and waits for another operation to be performed.

In S1321, the CPU 131 generates print data based on the print setting and the print data to be printed. Note that it is assumed that the print data to be printed is received from a print application when the print client is started.

In S1322, the CPU 131 transmits the print data generated in S1321 to the printer being selected (for example, the MFP 101). In S1323, the CPU 131 performs a process of re-determining the priority for print presets. This process is used for display control of the option 1110 shown in FIG. 11C and display control on a selection screen for selecting a print preset from the list of print presets. This makes it possible to display a print preset that is frequently used by the user in a highly visible area.

<Control of MFP 101>

Figure 16:
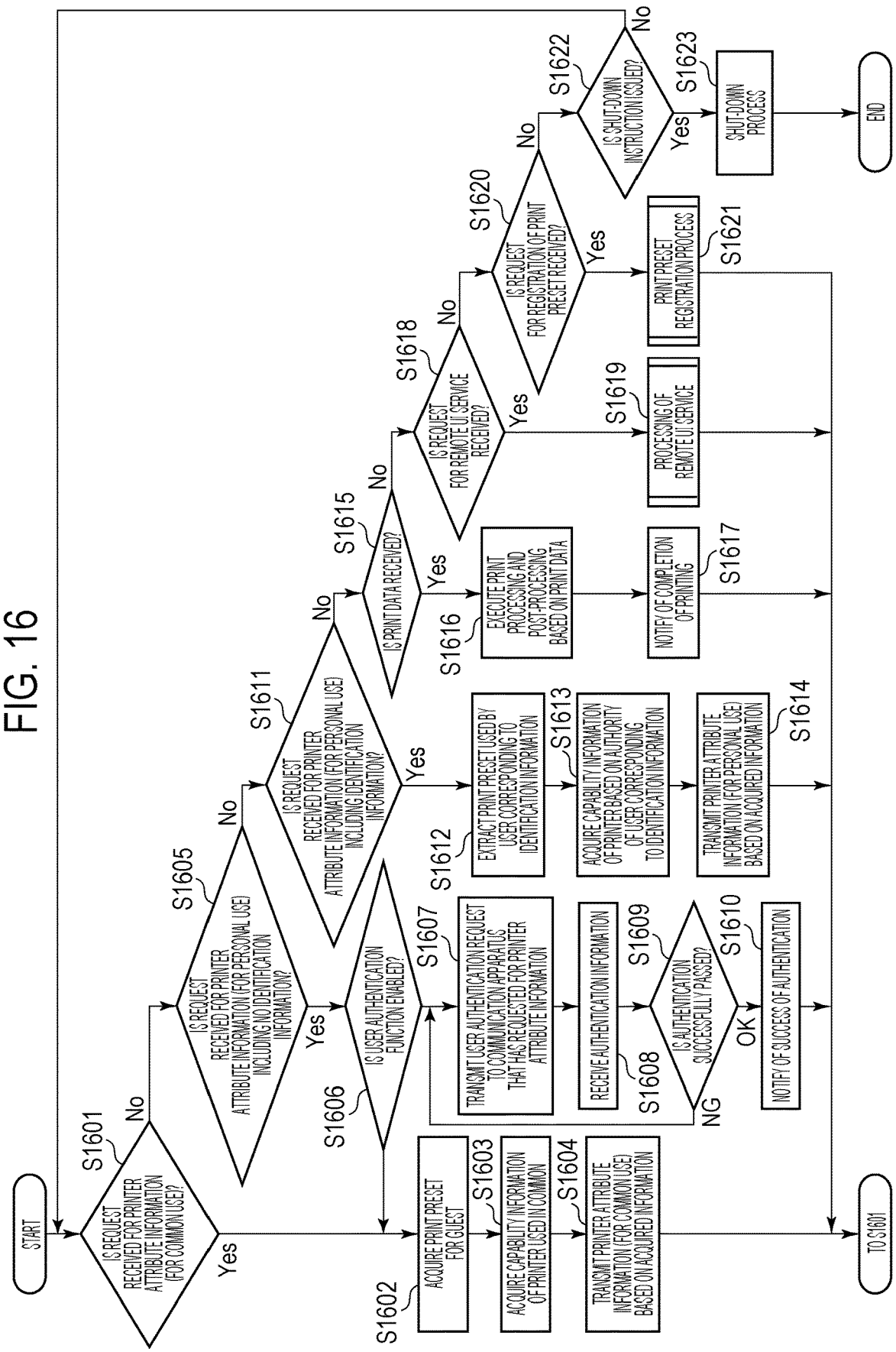
FIG. 16 is a flowchart illustrating an example of control of an MFP 101.
Figure 17:
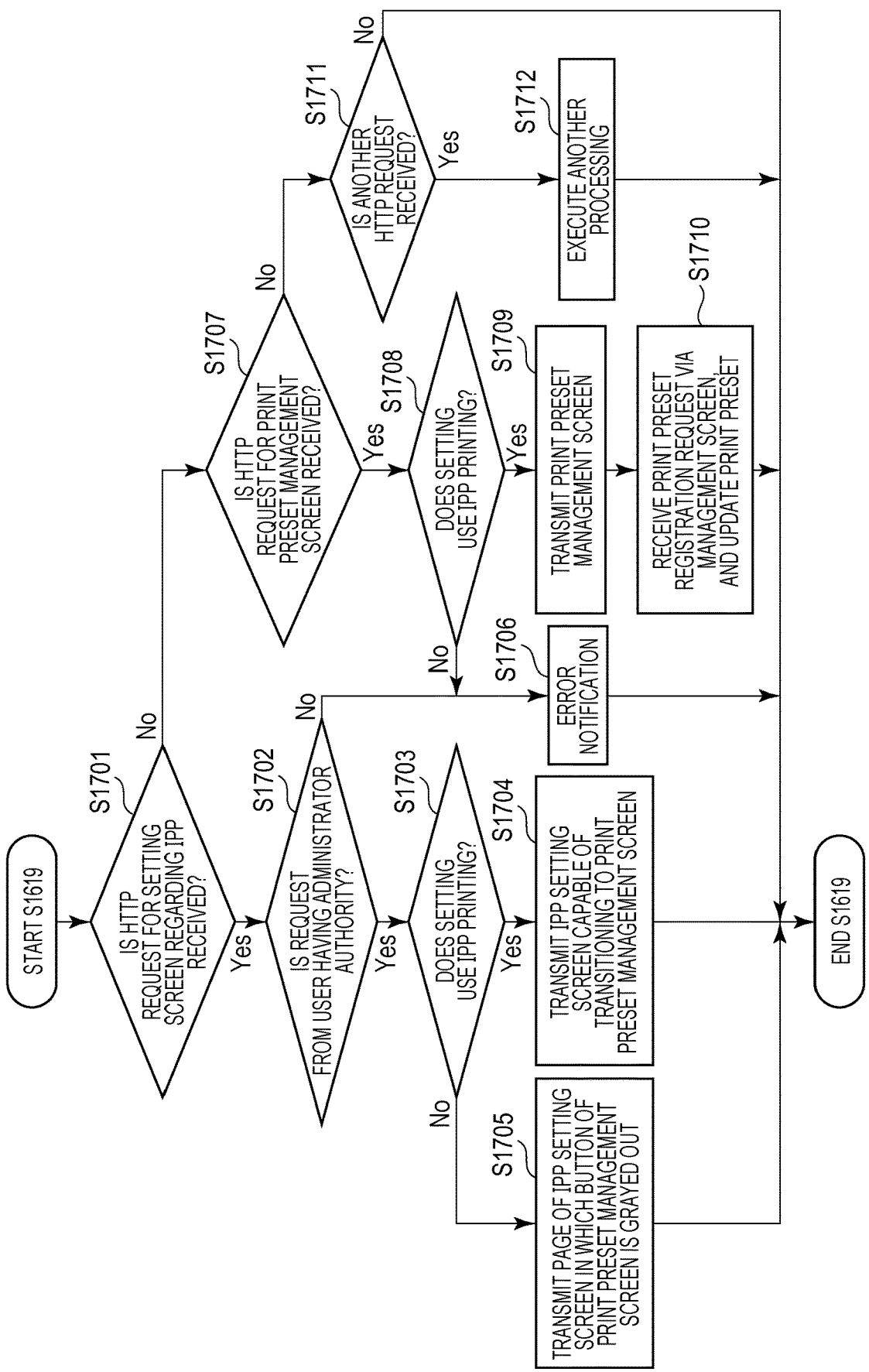
FIG. 17 is a flowchart illustrating an example of control of an MFP 101.

Next, an operation of the MFP 101 is described. FIGS. 16 to 18 are flowcharts showing control of the MFP 101. Each operation (step) shown in the flowcharts in FIGS. 16 to 18 is realized by the CPU 111 by reading a program for realizing each control module stored in the ROM 112 or the storage 114 into the RAM 113 and executing the program. In the present embodiment, the printing process, the data transmission/reception process, and the like are realized in cooperation with hardware for realizing each I/F and each function. Note that in a case where it is desired, in the following description, to clearly indicate a software module responsible for actual processing, a name of such a software module that controls the CPU to execute the processing is explicitly indicated and it will be described that the software module executes the processing instead of describing that the CPU executes the processing.

The flowchart in FIG. 16 shows a process executed when the power of the MFP 101 is turned on and the MFP 101 is started in a normal mode.

In S1601, the CPU 111 determines whether or not a request for printer attribute information (for common use) is received from an external apparatus such as the communication apparatus 102. In a case where the request for the printer attribute information (for common use) is received, the process proceeds to step S1602. However, in a case where the request for the printer attribute information (for common use) is not received, the process proceeds to step S1605.

In S1602, the CPU 111 acquires a preset for use by a guest user. When the IPP service 414 receives the request via the Get-Printer-Attributes command or the like, the IPP service 414 accesses the print preset storage unit 405 to acquires a print preset in which "standard" is set in the category 704.

In S1603, the CPU 111 acquires printer capability information. More specifically, the IPP service 414 acquires the capability information, described in the in the storage 114 or the like, of the printing unit and the sheet processing unit. The capability information includes, for example, printing capability and post-processing capability. Note that the acquisition timing is not limited to that in the example described above. For example, the capability information may be acquired when the IPP service 414 is activated, and the IPP service 414 may internally hold the capability information.

In S1604, the CPU 111 creates printer attribute information (for common use) based on the information acquired in S1602 and S1603. Subsequently, the CPU 111 transmits the printer attribute information (for common use) to the external apparatus as a response to the request received from the external apparatus (for example, the communication apparatus 102). The IPP service 414 generates a response regarding the printer attribute information as shown by 802 in FIG. 8A based on the acquired data. The generated response is transmitted to the external apparatus via the web server 416. When the transmission is completed, the CPU 131 advances the process to S1601.

In S1605, the CPU 111 determines whether or not a request is received for printer attribute information (for personal use) including no identification information. In a case where the request is received for the attribute information (for personal use) of the printer including no identification information, the process proceeds to S1606. On the other hand, in a case where the request is not received for the attribute information (for personal use) of the printer including no identification information, the process proceeds to S1611. Note that the request here is issued using the Get-User-Printer-Attributes command or the like. When the Web server 416 receives the request, the Web server 416 checks whether the request includes an effective session ID managed by the Web server 416. In a case where no such session ID is included, the Web server 416 determines that the request includes no identification information. In a case where the request includes an effective session ID managed by the Web server 416, the Web server determines that identification information is included.

In S1606, the CPU 111 determines whether or not the device setting specifies that the user authentication function is used. In a case where the device setting specifies to use the user authentication function, the process proceeds to step S1607. However, in a case where the device setting does not specify that the user authentication function is used, the process proceeds to step S1602. This process is an exceptional process for taking into account a case where the MFP 101 does not use the user authentication function.

In S1607, the CPU 111 issues a request for user authentication to the communication apparatus from which the attribute information (for personal use) acquisition request is received. In S1608, the CPU 111 receives the authentication information from the communication apparatus. In S1609, the CPU 111 authenticates the user based on the authentication information and determines whether the authentication is to be successfully passed or not. In a case where the authentication server is located outside the apparatus, the MFP 101 transfers the authentication information to the authentication server and inquires whether the authentication is to be passed or not. In a case where the authentication is successfully passed, the process proceeds to S1610.

However, in a case where the authentication fails, the process returns to S1607 and retransmits a user authentication request.

In S1610, the CPU 111 notifies the communication apparatus of the communication partner of the success of the authentication. More specifically, the Web server 416 establishes a session with the communication apparatus of the communication partner, and transmits a notification of the success of the authentication and the session ID for managing the session. The Web server 416 stores a user ID included in the authentication information received from the communication partner as a session variable associated with the session ID. This session variable is accessible from IPP Service 414. Therefore, based on the session ID included in the received request, the IPP service 414 can identify a user who has transmitted the request.

In S1611, the CPU 111 determines whether or not an acquisition request is received for printer attribute information (for personal use) including identification information. In a case where the acquisition request is received for the printer attribute information (for personal use) including the identification information, the process proceeds to step S1612. However, in a case where the acquisition request is not received for the printer attribute information (for personal use) including the identification information, the process proceeds to step S1615.

In S1612, the CPU 111 extracts the preset used by the user corresponding to the identification information. More specifically, the Web server 416 and the IPP service 414 cooperate to identify the user ID from the identification information (the session ID). The IPP service 414 accesses the print preset storage unit 405 of the setting storage unit 403 to extract a print preset used by a user corresponding to the specified user ID. In a case where print presets are managed on a user-by-user basis, a print preset used by the user is extracted based on the user ID. In a case where print presets are managed on a group-by-group basis, a group to which the user belongs is identified from the user ID, and a print preset stored in association with the group is extracted.

In S1613, the CPU 111 acquires printer capability information based on the authority of the user corresponding to the identification information. More specifically, the IPP service 414 refers to function restriction information for each user stored in the storage 114 or the like, and acquires function restriction information related to the user corresponding to the identification information.

In S1614, the CPU 111 creates printer attribute information (for personal use) based on the acquired information, and transmits the resultant printer attribute information (for common use) as a response to the communication apparatus of the communication partner. More specifically, the IPP service 414 generates, as a response, printer attribute information such as that shown in 806 in FIG. 8B based on the acquired data. The generated response is transmitted to the external apparatus via the web server 416. When the transmission is completed, the CPU 131 advances the process to S1601.

In S1615, the CPU 111 determines whether or not print data is received. In a case where print data is received, the process proceeds to step S1616. However, in a case where print data is not received, the process proceeds to step S1618.

In S1616, the CPU 111 executes a printing process and post-processing on a printed sheet based on the received print data. These processes are realized by the cooperation of the modules 402, 406, 407, 408, 412, 413, and respective I/F units and hardware units controlled by the modules. When the printing process and the post-process are completed, the CPU 111 advances the process to S1617.

In S1617, the CPU 111 notifies the communication apparatus, from which the print data is received, of the end of printing, and advances the process to S1601.

On the other hand, in S1618, the CPU 111 determines whether or not a request for remote UI service is received. In a case where the request for the remote UI service is received, the Web server 416 advances the process to S1619. However, in a case where the request for the remote UI service is not received, the Web server 416 advances the process to S1620.

In S1619, the CPU 111 executes processing related to the remote UI service. A specific process is described below with reference to FIG. 17. Note that the process shown in FIG. 17 is executed mainly by the remote UI service 415 and the Web server 416.

In S1701, the CPU 111 determines whether or not a request is received for a IPP setting screen. In a case where the request for the IPP setting screen is received, the process proceeds to S1702. However, in a case where the request for the IPP setting screen is not received, the process proceeds to S1707.

In S1702, the CPU 111 determines whether the request is from a user having administrative authority. In a case where the request is from a user having administrative authority, the process proceeds to step S1703. However, in a case where the request is from a user who does not have administrative authority, the process proceeds to step S1706. Note that the user authority is acquired by referring to the user authority corresponding to the session ID that is identification information included in the HTTP request. In S1706, the CPU 111 transmits an error notification to the communication apparatus of the communication partner and advances the processing to S1601.

In S1703, the CPU 111 determines whether or not the setting specifies that IPP printing is used. In a case where the setting specifies that the IPP printing is used, the process proceeds to S1705. However, in a case where the setting specifies that the IPP printing is not used (use of the IPP printing is not allowed), the process proceeds to S1704.

In S1704, the CPU 111 transmits a Web page of an IPP setting screen capable of transiting to a preset management screen to the partner communication apparatus. On the other hand, in step S1705, the CPU 111 transmits, to the partner communication apparatus, a Web page of an IPP setting screen with a button for transitioning to a preset management screen grayed out.

In S1707, the CPU 111 determines whether or not an HTTP request for a preset management screen is received. In a case where the HTTP request for the preset management screen is received, the process proceeds to S1708. However, in a case where the HTTP request for the preset management screen is not received, the process proceeds to S1711.

In S1708, the CPU 111 determines whether or not the setting specifies to use IPP printing. In a case where the setting specifies that the IPP printing is used, the process proceeds to S1709. However, in a case where the setting specifies that the IPP printing is not used, the process proceeds to S1706.

In S1709, the CPU 111 transmits a Web page of the preset management screen to the partner communication apparatus. In S1710, the CPU 111 receives the preset registration request generated through the user operation via the preset management screen, and registers the print preset in the storage unit 405.

More specifically, the Web server 416 receives, via HTTP communication, data indicating the print setting set via the input form on the management screen or the like and transfers the data to the remote UI service 415. Upon receiving the data, the remote UI service 415 generates a print preset based on the data and registers a new preset in the print preset unit 305 or updates an existing preset.

Subsequently, in S1711, the CPU 111 determines whether or not another HTTP request is received. If such an HTTP request is received, the process proceeds to S1712, but if no such HTTP request is received, the process proceeds to S1601.

In S1712, the CPU 111 executes other processing. The other processing may include, for example, processing for changing the device settings of the MFP 101 or processing for updating the firmware of the MFP 101. For example, when the CPU 111 receives an instruction from an external apparatus to change the setting to the setting in which IPP printing is used, the CPU 111 executes this processing. When the execution of the other processing is completed, the CPU 111 advances the processing to S1601.

Referring again to FIG. 16, in S1620, the CPU 111 determines whether or not a registration request for registering a print preset is received. If the registration request for registering the print preset is received, the process proceeds to step S1621, but if the registration request for registering the print preset is not received, the process proceeds to step S1622.

In S1621, the CPU 111 performs a process for registering a print preset. A specific process is described below with reference to FIG. 18.

In step S1801, the CPU 111 determines whether or not a print preset registration request including identification information is received. If the print preset registration request including the identification information is received, the process advances to step S1802. On the other hand, in a case where the registration request of the print preset including the identification information is not received (that is, in a case where the registration request including no identification information is received), a communication error notification is transmitted to the partner communication apparatus, and the process returns to S1601.

In S1802, the CPU 111 identifies a user corresponding to the identification information added to the registration request. More specifically, the IPP service 414 cooperates with the Web server 416 to identify the user ID from the session ID included in the registration request.

In S1803, the CPU 111 performs a print preset registration process based on the preset information included in the registration request. In this process, new registration, updating, or error handling is performed. The specific process thereof has been described in 522 in FIG. 5, and thus a duplicated description thereof is omitted. When the registration process is completed, the CPU 111 advances the process to S1601.

Referring again to FIG. 16, in S1622, the CPU 111 determines whether or not a shutdown instruction is received. In a case where the shutdown instruction is received, the process proceeds to S1623, but in a case where the shutdown instruction is not received, the process proceeds to S1601.

In S1623, the CPU 111 performs the shutdown process on the MFP 101 and ends the series of processes.

As described above, in the present embodiment, the MFP 101, which is the image forming apparatus, stores information indicating correspondence between a user and a print preset. Therefore, it is possible to appropriately transmit a notification of a print preset for use by a user to a communication apparatus using a print client. In addition, in the present embodiment, it is possible to appropriately register a print preset based on an operation by an authenticated user. Furthermore, in the present embodiment, a print preset can be registered from a print client or a Web browser. Furthermore, in the present embodiment, the print client can acquire and use a print preset stored in an image forming apparatus such as the MFP 101, and can use a print preset registered in the print client by a user operation, which provides an enhanced convenience. Therefore, the user can acquire a basic print preset from the MFP 101 and modify the print preset to a desired print preset. This provides a high convenience.

<Modifications>

In the embodiments described above, it is assumed that identification information included in a request issued by the communication terminal 102 is a session ID or an access token, but this is by way of example and not limitation For example, identification information such as a user ID may be added to a request transmitted from the communication terminal 102 to the MFP 101. In this case, the MFP 101 identifies a communication terminal user who has issued the request based on the user ID included in the received request.

Furthermore, in the embodiments described above, inputting of authentication information is prompted in 511 and 512 in FIG. 5, but this is by way of example and not limitation. For example, authentication information used for IPP authentication may be stored as a print client setting. More specifically, a user may input authentication information regarding the IPP authentication in advance via a setting screen of a print client, and the input authentication information may be stored in the storage 134. When the communication apparatus 102 receives an authentication request in 510, the communication apparatus 102 may acquire the authentication information stored in the storage 134 and transmit the authentication information to the MFP 101, instead of performing the processes in 511 and 512.

In the embodiments described above, print presets are described. However, the applications of the invention are not limited to the print presets. For example, the present invention can be applied to a preset regarding a scan setting used when a communication terminal issues a scan request to the MFP 101, a preset regarding a copy setting used when the communication terminal issues a copy request to the MFP 101, etc.

According to the present invention, correspondence information between a user and a print preset is stored so as to make it possible to appropriately provide a notification of a print preset used by a user to a communication apparatus using a print client. In an aspect of the present invention, it is possible to provide a mechanism of appropriately registering a print preset based on an operation by an authenticated user.

The present invention is not limited to the above-described embodiments, but various changes and modifications can be made without departing from the spirit and scope of the present invention. Therefore, the following Claims are appended to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus that forms an image based on print data, comprising:
    a memory configured to store a first preset name corresponding to a first combination of print setting values, a second preset name corresponding to a second combination of print setting values, and a common preset name corresponding to a third combination of print setting values that has been registered by a user having an administrative authority of the printing apparatus, wherein the first preset name corresponds to a first user identifier and the second preset name corresponds to a second user identifier that is different from the first user identifier;
    a network interface configured to receive the first user identifier and print data from a communication apparatus; and
    a controller including a processor, the controller configured to:
        transmit the common preset name to the communication apparatus before the printing apparatus receives the first user identifier from the communication apparatus,
        transmit, to the communication apparatus, the stored first preset name and the first combination of print setting values corresponding to the first user identifier that has been received from the communication apparatus without transmitting the second preset name and the second combination of print setting values, wherein the transmitted first preset name is displayed as an option by the communication apparatus; and
        execute process for printing based on the print data received from the communication apparatus, wherein the print data is generated based on the print setting values that are set in a case that the transmitted first preset name has been selected via an object displayed by the communication apparatus that has received the transmitted first preset name.

2. The printing apparatus according to claim 1, wherein the print data is received from the communication apparatus in accordance with the Internet Printing Protocol (IPP).

3. The printing apparatus according to claim 1, further comprising a Web server, wherein
    the Web server is configured to provide, to a Web browser, a Web page for registering a preset name and print setting values that are associated with the registered preset name.

4. The printing apparatus according to claim 1, wherein the first user identifier received from the communication apparatus corresponds to a user that operates the communication apparatus.

5. The printing apparatus according to claim 1, wherein the second preset name and the second combination of print setting values are transmitted to the communication apparatus in a case that the second user identifier is received from the communication apparatus.

6. The printing apparatus according to claim 1, wherein the controller is further configured to:
    transmit, to the communication apparatus, a request for authentication, wherein the first user identifier that the printing apparatus receives is input based on the request.

7. The printing apparatus according to claim 6, wherein the communication apparatus displays an input field for inputting the user identifier based on the transmitted request for authentication.

8. The printing apparatus according to claim 1, wherein the print data is generated based on a print instruction received in a situation that the first preset name has been selected by a user of the communication apparatus.

9. The printing apparatus according to claim 1, wherein the controller is further configured to enable a print function by using the Internet Printing Protocol in accordance with a user operation, wherein the first preset name is transmitted in accordance with the Internet Printing Protocol in a case that the print function is enabled.

10. The printing apparatus according to claim 1, wherein the first preset name is transmitted to the communication apparatus as a response of a request defined by the Internet Printing Protocol.

11. The printing apparatus according to claim 1, wherein the first preset name is transmitted to the communication apparatus as a response of a Get-User-Printer-Attributes command.

12. A method of controlling a printing apparatus that forms an image based on print data and includes a memory configured to store a first preset name corresponding to a first combination of print setting values, a second preset name corresponding to a second combination of print setting values, and a common preset name corresponding to a third combination of print setting values that has been registered by a user having an administrative authority of the printing apparatus, wherein the first preset name corresponds to a first user identifier and the second preset name corresponds to a second user identifier that is different from the first user identifier, and a network interface configured to receive the first user identifier and print data from a communication apparatus, the method comprising:
    transmitting the common preset name to the communication apparatus before the printing apparatus receives the first user identifier from the communication apparatus,
    transmitting, to the communication apparatus, the stored first preset name and the first combination of print setting values corresponding to the first user identifier that has been received from the communication apparatus without transmitting the second preset name and the second combination of print setting values, wherein the transmitted first preset name is displayed as an option by the communication apparatus; and
    executing process for printing based on the print data received from the communication apparatus, wherein the print data is generated based on the print setting values that are set in a case that the transmitted first preset name has been selected via an object displayed by the communication apparatus that has received the transmitted first preset name.

13. A non-transitory computer-readable storage medium storing a program causing a printing apparatus that includes a memory configured to store a first preset name corresponding to a first combination of print setting values, a second preset name corresponding to a second combination of print setting values, and a common preset name corresponding to a third combination of print setting values that has been registered by a user having an administrative authority of the printing apparatus, wherein the first preset name corresponds to a first user identifier and the second preset name corresponds to a second user identifier that is different from the first user identifier, and a network interface configured to receive the first user identifier and print data from a communication apparatus to:

transmit the common preset name to the communication apparatus before the printing apparatus receives the first user identifier from the communication apparatus, transmit, to the communication apparatus, the stored first preset name and the first combination of print setting values corresponding to the first user identifier that has been received from the communication apparatus without transmitting the second preset name and the second combination of print setting values, wherein the transmitted first preset name is displayed as an option by the communication apparatus; and execute process for printing based on the print data received from the communication apparatus, wherein the print data is generated based on the print setting values that are set in a case that the transmitted first preset name has been selected via an object displayed by the communication apparatus that has received the transmitted first preset name.

\* \* \* \* \*